(12) United States Patent
Sato

(10) Patent No.: US 8,359,940 B2
(45) Date of Patent: Jan. 29, 2013

(54) CONTROL SYSTEM FOR TRANSMISSION

(75) Inventor: Takao Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 224 days.

(21) Appl. No.: 12/868,970

(22) Filed: Aug. 26, 2010

(65) Prior Publication Data

US 2011/0056317 A1     Mar. 10, 2011

(30) Foreign Application Priority Data

Sep. 4, 2009    (JP) ................................. 2009-204389

(51) Int. Cl.
     *F16H 59/00*        (2006.01)
(52) U.S. Cl. .............. 74/335; 74/336 R; 74/342; 74/745
(58) Field of Classification Search .................... 74/335, 74/336 R, 340, 342, 343, 745
See application file for complete search history.

(56) References Cited

U.S. PATENT DOCUMENTS

| | | | |
|---|---|---|---|
| 5,921,888 A * | 7/1999 | Park .............................. | 477/131 |
| 6,347,557 B1 * | 2/2002 | Asatsuke et al. ............ | 74/336 R |
| 6,397,695 B1 * | 6/2002 | Okada et al. .................... | 74/335 |
| 6,453,763 B2 * | 9/2002 | Tanizawa et al. ............... | 74/335 |
| 2002/0061803 A1 * | 5/2002 | Aoki ................................. | 477/3 |
| 2006/0150762 A1 | 7/2006 | Petrzik | |
| 2010/0186530 A1 * | 7/2010 | Tamai et al. ............... | 74/473.11 |

FOREIGN PATENT DOCUMENTS

| | | |
|---|---|---|
| EP | 1 916 457 A2 | 4/2008 |
| JP | 09-280367 A | 10/1997 |
| JP | 2008-309217 A | 12/2008 |
| WO | 2008/108977 A1 | 9/2008 |

OTHER PUBLICATIONS

European Search Report dated Nov. 18, 2010, issued in corresponding European Patent Application No. 10174652.

* cited by examiner

*Primary Examiner* — Ha D. Ho
(74) *Attorney, Agent, or Firm* — Westerman, Hattori, Daniels & Adrian, LLP

(57) ABSTRACT

In a twin-clutch transmission, when a third shift valve (for example) goes out of order and the shift change accordingly becomes incapable of being carried out, the hydraulic pressure outputted from the third shift valve is controlled by a fourth shift valve operated by a first shift solenoid for a first shift valve. Accordingly, the hydraulic pressure outputted by a second linear solenoid is supplied to one of second hydraulic actuators, thereby enabling one of second predetermined transmission gear stages to be pre-shifted by use of a second power transmission path. When the first shift valve is used as a fail-safe, it is possible for the vehicle to make a minimum necessary run by setting up one of the second predetermined transmission gear stages. Furthermore, the fourth shift valve is driven by use of the existing first shift solenoid, thus minimizing the number of parts and cost.

18 Claims, 16 Drawing Sheets

SECOND SPEED TRANSMISSION GEAR STAGE (IN FAILURE CONDITION)

SECOND SPEED TRANSMISSION GEAR STAGE (IN NORMAL WORKING CONDITION)

FOURTH SPEED TRANSMISSION GEAR STAGE
(IN NORMAL WORKING CONDITION)

FOURTH SPEED TRANSMISSION GEAR STAGE
(IN FAILURE CONDITION)

SIXTH SPEED TRANSMISSION GEAR STAGE (IN NORMAL WORKING CONDITION)

SIXTH SPEED TRANSMISSION GEAR STAGE (IN FAILURE CONDITION)

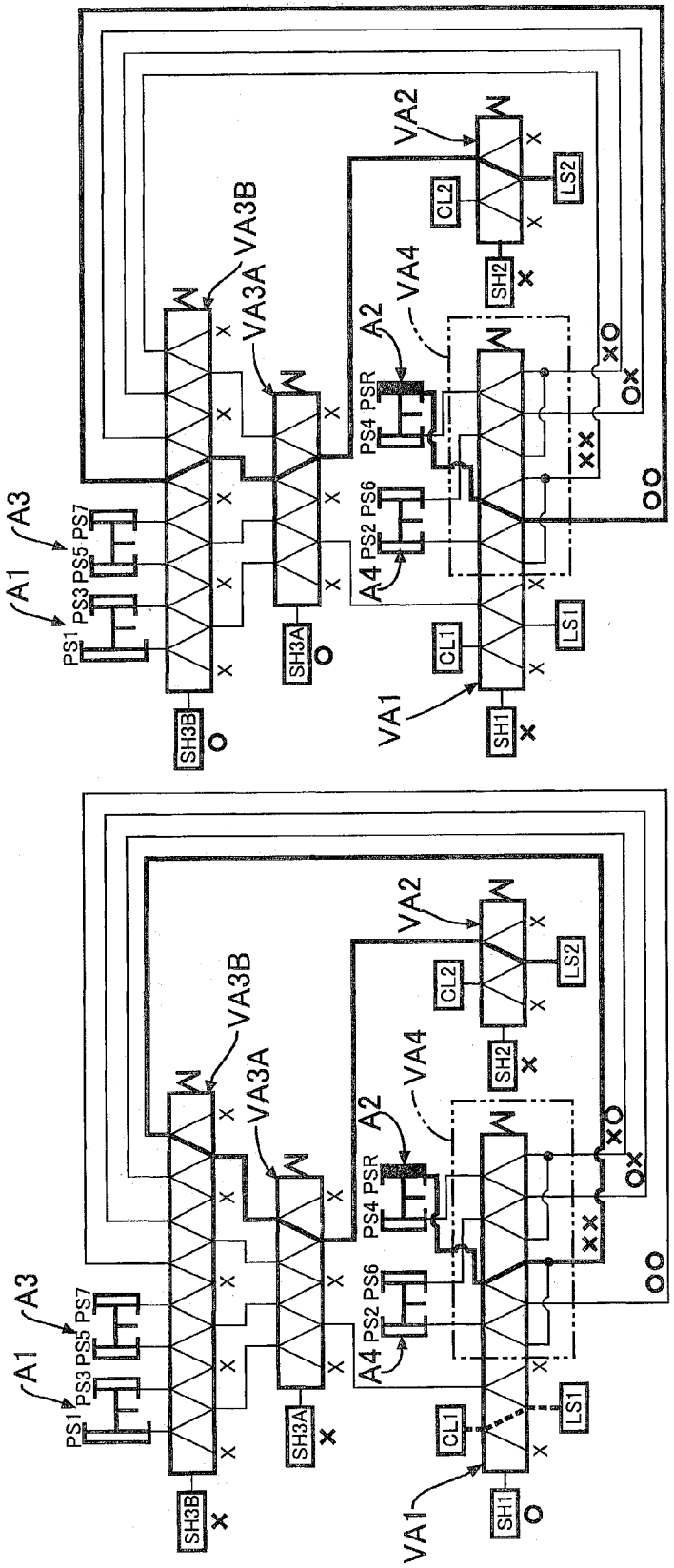

FIG.10

| | | VA1 | VA2 | VA3A | VA3B | VA4 | CL1 | CL2 | PS1 | PS3 | PS5 | PS7 | PS2 | PS4 | PS6 | PSR |
|---|---|---|---|---|---|---|---|---|---|---|---|---|---|---|---|---|
| D | NORMAL RUNNING — RUNNING WITH ODD-NUMBERED GEAR STAGE | | | | | | | | | | | | | | | |
| | SECOND SPEED PRE-SHIFT | O | × | O | O | ×/O | LS1 | — | — | — | — | — | LS2 | — | — | — |
| | SIXTH SPEED PRE-SHIFT | O | × | O | × | ×/O | LS1 | — | — | — | — | — | — | LS2 | — | — |
| | FOURTH SPEED PRE-SHIFT | O | × | × | O | ×/O | LS1 | — | — | — | — | — | — | — | LS2 | — |
| | RVS PRE-SHIFT | O | × | × | × | ×/O | LS1 | — | — | — | — | — | — | — | — | LS2 |
| | NORMAL RUNNING — RUNNING WITH EVEN-NUMBERED GEAR STAGE | | | | | | | | | | | | | | | |
| | FIRST SPEED PRE-SHIFT | × | O | O | O | ×/O | — | LS2 | LS1 | — | — | — | — | — | — | — |
| | THIRD SPEED PRE-SHIFT | × | O | O | × | ×/O | — | LS2 | — | LS1 | — | — | — | — | — | — |
| | FIFTH SPEED PRE-SHIFT | × | O | × | O | ×/O | — | LS2 | — | — | LS1 | — | — | — | — | — |
| | SEVENTH SPEED PRE-SHIFT | × | O | × | × | ×/O | — | LS2 | — | — | — | LS1 | — | — | — | — |
| | CHANGE GEARS | O | O | ×/O | ×/O | ×/O | LS1 | LS2 | — | — | — | — | — | — | — | — |
| | FAILURE | | | | | | | | | | | | | | | |
| | FIRST SPEED/RVS PRE-SHIFT | × | × | O | O | ×/O | — | — | LS1 | — | — | — | — | — | — | — |
| | THIRD SPEED/FOURTH SPEED PRE-SHIFT | × | × | O | × | ×/O | — | — | — | LS1 | — | — | — | LS2 | — | — |
| | FIFTH SPEED/SIXTH SPEED PRE-SHIFT | × | × | × | O | ×/O | — | — | — | — | LS1 | — | — | — | LS2 | — |
| | SEVENTH SPEED/SECOND SPEED PRE-SHIFT | × | × | × | × | ×/O | — | — | — | — | — | LS1 | LS2 | — | — | — |
| P,N | CUT HYDRAULIC PRESSURE TO CL1, CL2 COMPARED TO D RANGE | | | | | | | | | | | | | | | |
| R | CUT HYDRAULIC PRESSURE TO CL1 COMPARED TO D RANGE | | | | | | | | | | | | | | | |

RUNNING WITH EVEN-NUMBERED GEAR STAGE + PRE-SHIFT OF ODD-NUMBERED (FIRST) GEAR STAGE ×○○○

CONTROL SYSTEM FOR TRANSMISSION

BACKGROUND OF THE INVENTION

The present invention relates to a control system for what is termed as a twin-clutch transmission. The twin-clutch transmission is configured to set up multiple transmission gear stages by use of a first power transmission path for transmitting a driving force of an engine to driving wheels via a first clutch, and to set up the other multiple transmission gear stages by use of a second power transmission path for transmitting the driving force of the engine to the driving wheels via a second clutch.

Such a twin-clutch transmission is designed to accomplish shift-up and shift-down by repeatedly sequentially carrying out: the pre-shifting of an even-numbered speed transmission gear stage while an odd-numbered speed transmission gear stage is being set up with engagement of the first clutch; the setting up of the even-numbered speed transmission gear stage once the second clutch is engaged in exchange for disengagement of the first clutch; the pre-shifting of an odd-numbered speed transmission gear stage while the even-numbered speed transmission gear stage is being set up with the engagement of the second clutch; and the setting up of the odd-numbered speed transmission gear stage once the first clutch is engaged in exchange for disengagement of the second clutch.

Japanese Patent Application Laid-open No. 2008-309217 has made publicly known a transmission control system which achieves reduction in the number of shift valves by making shift valves commonly used both as shift valves for selectively supplying a hydraulic pressure to the first or second clutch, and as shift valves for selectively supplying a hydraulic pressure to a first or a second hydraulic actuator.

Meanwhile, even in a case where one of the shift valves each configured to distribute a hydraulic pressure to engagement means for setting up transmission gear stages goes out of order in such a twin-clutch transmission, a vehicle can run to a car service shop if either a first predetermined transmission gear stage in the first power transmission path or a second predetermined transmission gear stage in the second power transmission path is designed to be capable of being set up. This enhances convenience in emergency situations. In this case, if dedicated redundancy means are installed in the twin-clutch transmission for the purpose of counteracting the anticipated possible failure in the shift valves, such installation causes increase in costs and weight. For this reason, it is desirable that only minimum necessary measures using the existing hydraulic circuit should be taken to enable the vehicle to run when one of the shift valves goes out of order.

SUMMARY OF THE INVENTION

The present invention has been made with the above-described situation taken into consideration. The present invention has a twin-clutch transmission capable of setting up a predetermined transmission gear stage when a shift valve is out of order, and accordingly enables the car to run under such conditions.

According to a first feature of the present invention, there is provided a control system for a transmission including: a first clutch for transmitting a driving force of an engine to a first input shaft; a first gear group placed in a first power transmission path from the first input shaft to an output shaft; a plurality of first engagement means for setting up one of first predetermined transmission gear stages by connecting one gear of the first gear group to the first input shaft or the output shaft; a plurality of first hydraulic actuators for operating the plurality of first engagement means, respectively; a second clutch for transmitting the driving force of the engine to a second input shaft; a second gear group placed in a second power transmission path from the second input shaft to the output shaft; a plurality of second engagement means for setting up one of second predetermined transmission gear stages by connecting one gear of the second gear group to the second input shaft or the output shaft; and a plurality of second hydraulic actuators for operating the plurality of second engagement means, respectively, the control system comprising: a first shift valve, operated by a first shift solenoid, for supplying a hydraulic pressure to the first clutch or one of the first hydraulic actuators, the hydraulic pressure being outputted by a first hydraulic pressure regulating device; a second shift valve, operated by a second shift solenoid, for supplying a hydraulic pressure to the second clutch or one of the second hydraulic actuators, the hydraulic pressure being outputted by a second hydraulic pressure regulating device; a third shift valve, operated by a third shift solenoid, for supplying the hydraulic pressures, which are outputted by the respective first and second shift valves, selectively to any one of the first and second hydraulic actuators; and a fourth shift valve placed between the third shift valve and the second hydraulic actuators, the fourth shift valve being operated by the first shift solenoid.

With the configuration according to the first feature of the present invention, a hydraulic circuit for a twin-clutch transmission includes: the first shift valve operated by the first shift solenoid, the first shift valve being configured to supply the hydraulic pressure, which is outputted by the first hydraulic pressure regulating device, to the first clutch or one of the first hydraulic actuators; the second shift valve operated by the second shift solenoid, the second shift valve being configured to supply the hydraulic pressure, which is outputted by the second hydraulic pressure regulating device, to the second clutch or one of the second hydraulic actuators; the third shift valve operated by the third shift solenoid, the third shift valve being configured to supply the hydraulic pressures, which are outputted by the respective first and second shift valves, selectively to one of the first and second hydraulic actuators; and the fourth shift valve placed between the third shift valve and the second hydraulic actuators, the fourth shift valve being operated by the first shift solenoid. For this reason, when the third shift valve operated by the third shift solenoid goes out of order and the shift change accordingly becomes incapable of being carried out, the hydraulic pressure, which is outputted from the broken third shift valve, is controlled by the fourth shift valve which is operated by the first shift solenoid. Thereby, the hydraulic pressure which is outputted by the second hydraulic pressure regulating device can be supplied to one of the second hydraulic actuators, and this enables one of the second predetermined transmission gear stages to be pre-shifted by use of the second power transmission path. In the case where the first shift valve is used as a fail-safe as described above, the hydraulic pressure outputted by the first hydraulic pressure regulating device can be supplied to none of the first hydraulic actuators and the first clutch, and none of the first predetermined transmission gear stages accordingly can be pre-shifted by use of the first power transmission path. Consequently, the vehicle is not capable of running with any one of the first predetermined transmission gear stages. However, the configuration according to the first feature thereof enables the one of the second predetermined transmission gear stages to be set up, and accordingly makes it possible for the vehicle to make a minimum necessary run.

Furthermore, the configuration according to the first feature thereof drives the fourth shift valve by use of the existing first shift solenoid for driving the existing first shift valve. For this reason, it is possible to keep the increase in the number of parts and costs to a minimum.

According to a second feature of the present invention, in addition to the first feature, there is provided the control system for a transmission, wherein the second predetermined transmission gear stages include a forward transmission gear stage and a reverse transmission gear stage.

With the configuration according to the second feature of the present invention, the second predetermined transmission gear stages include the forward transmission gear stage and the reverse transmission gear stage, and this enables the vehicle to run forward and backward when the transmission goes into failure.

According to a third feature of the present invention, in addition to the first or second feature, there is provided the control system for a transmission, wherein the third shift valves are made up of two shift valves which are placed in series.

With the configuration according to the third feature of the present invention, the third shift valves are made up of two shift valves placed in series, and accordingly it is possible to increase the number of transmission gear stages while keeping the number of third shift valves to a minimum.

According to a fourth feature of the present invention, in addition to the third feature, there is provided the control system for a transmission, wherein the two shift valves placed in series are operated by the third shift solenoids, respectively.

With the configuration according to the fourth feature of the present invention, the two shift valves, which are placed in series, are operated by the respective third shift solenoids, and accordingly it is possible to increase the number of transmission gear stages by controlling the positions of each of the two shift valves separately.

According to a fifth feature of the present invention, in addition to any one of the first to fourth features, there is provided the control system for a transmission, wherein the first shift valve and the fourth shift valve are made as separated bodies, respectively.

With the configuration according to the fifth feature of the present invention, the first and fourth shift valves are made as the respective separated bodies, and thus it is possible to make the total length of the first and fourth shift valves shorter than the total length of the first and fourth shift valves which are formed integrally, thereby enhancing ease of installation of the first shift and fourth shift valves.

According to a sixth feature of the present invention, in addition to any one of the first to fourth features, there is provided the control system for a transmission, wherein the first shift valve and the fourth shift valve are made as a single integrated body.

With the configuration according to the sixth feature of the present invention, the first shift valve and the fourth shift valve are made as a single integrated body, and accordingly it is possible to make the number of parts for the integrated first and fourth shift valves smaller than those of the first and fourth shift valves which are formed as the respective separated bodies.

Here, first and second auxiliary input shafts 14, 15 of embodiments correspond to the first and second input shafts of the present invention, respectively; first and second output shafts 16, 17 of the embodiments correspond to the output shaft of the present invention; a first speed-third speed hydraulic actuator A1 and a fifth speed-seventh speed hydraulic actuator A3 of the embodiments correspond to the first hydraulic actuators of the present invention; a fourth speed-reverse hydraulic actuator A2 and a second speed-sixth speed hydraulic actuator A4 of the embodiments correspond to the second hydraulic actuators of the present invention; first and second linear solenoids LS1, LS2 of the embodiments correspond to the first and second hydraulic pressure regulating devices of the present invention, respectively; a first speed-third speed synchronization apparatus S1 and a fifth speed-seventh speed synchronization apparatus S3 correspond to the first engagement means of the present invention; a fourth speed-reverse synchronization apparatus S2 and a second speed-sixth speed synchronization apparatus S4 correspond to the second engagement means of the present invention; 3A-numbered and 3B-numbered shift solenoids SH3A, SH3B of the embodiments correspond to the third shift solenoid of the present invention; and 3A-numbered and 3B-numbered shift valves VA3A, VA3B of the embodiments correspond to the third shift valve of the present invention.

BRIEF DESCRIPTION OF THE DRAWINGS

The advantages of the invention will become apparent in the following description taken in conjunction with the drawings, wherein:

FIGS. 7A and 7B are diagrams for explaining operations which are carried out when a reverse transmission gear stage is pre-shifted according to the first embodiment, respectively;

FIG. 10 is an operation table of the hydraulic circuit for the automatic transmission according to the first embodiment;

DETAILED DESCRIPTION OF THE INVENTION

Hereinafter, descriptions will be provided for a first embodiment of the present invention on the basis of FIGS. 1 to 10.

Figure 1:
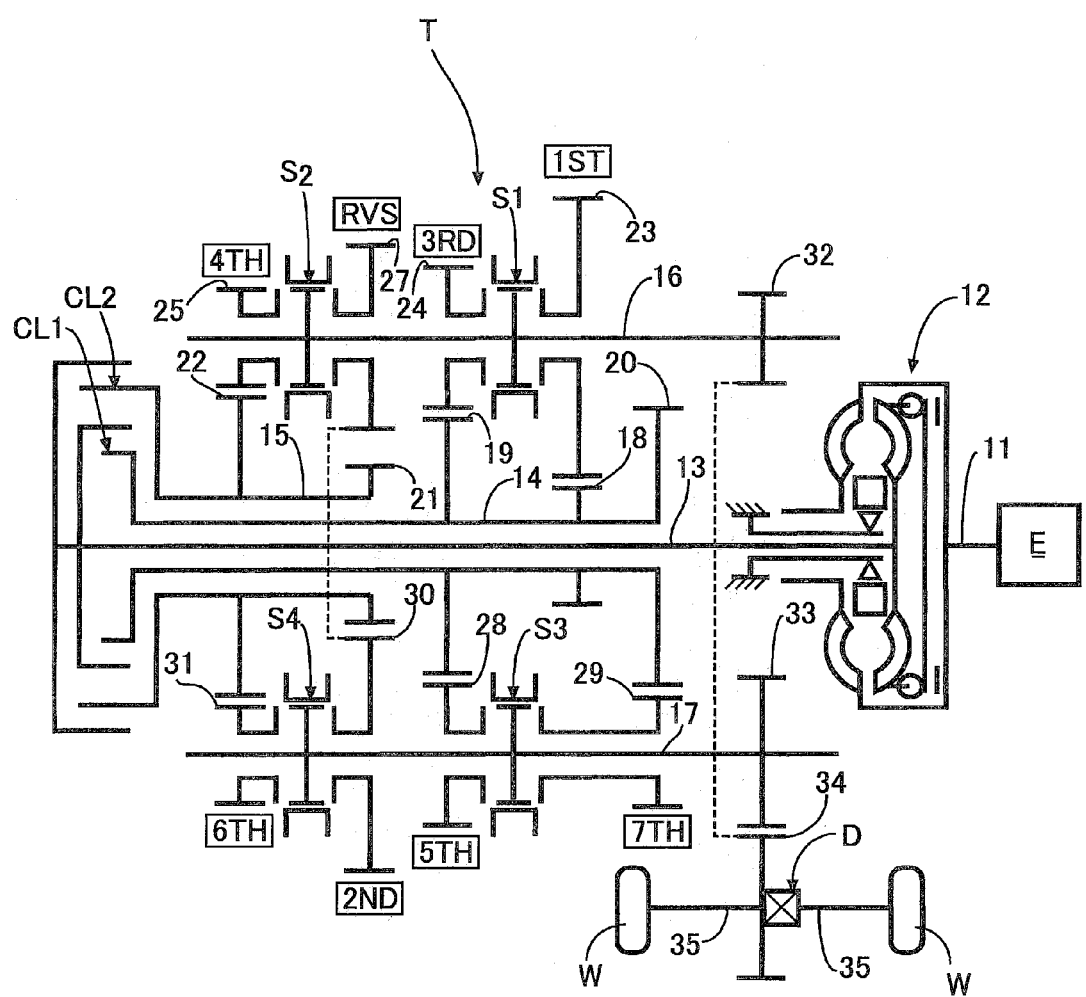
FIG. 1 is a skeleton diagram of a twin-clutch automatic transmission according to a first embodiment.

FIG. 1 shows a skeleton of a twin-clutch automatic transmission for providing seven forward speeds and one reverse speed. An automatic transmission T includes a main input shaft 13 into which a driving force of a crank shaft 11 of an engine E is inputted via a torque converter 12. A first auxiliary input shaft 14 and a second auxiliary input shaft 15 are fitted to an outer periphery of the main input shaft 13 coaxially and rotatably relative to the main input shaft 13. The main input shaft 13 and the first auxiliary input shaft 14, which is inner in a radial direction, are capable of being connected together through a wet multi-plate first clutch CL1. The main input shaft 13 and the second auxiliary input shaft 15, which is outer in the radial direction, are capable of being connected together through a wet multi-plate second clutch CL2. In addition, a first output shaft 16 and a second output shaft 17 are placed in parallel with the main input shaft 13.

A first speed drive gear 18, a third speed-fifth speed drive gear 19 and a seventh speed drive gear 20 are installed fixed to the first auxiliary input shaft 14. A second speed-reverse drive gear 21 and a fourth speed-sixth speed drive gear 22 are installed fixed to the second auxiliary input shaft 15.

A first speed driven gear 23, a third speed driven gear 24, a fourth speed driven gear 25 and a reverse driven gear 27 are supported by the first output shaft 16 rotatably relative to the first output shaft 16. The first speed driven gear 23 is in mesh with the first speed drive gear 18. The third speed driven gear 24 is in mesh with the third speed-fifth speed drive gear 19. The fourth speed driven gear 25 is in mesh with the fourth speed-sixth speed drive gear 22. The first speed driven gear 23 and the third speed driven gear 24 are capable of being selectively connected to the first output shaft 16 via a first speed-third speed synchronization apparatus S1. The fourth speed driven gear 25 and the reverse driven gear 27 are capable of being selectively connected to the first output shaft 16 via a fourth speed-reverse synchronization apparatus S2.

A fifth speed driven gear 28, a seventh speed driven gear 29, a second speed driven gear 30 and a sixth speed driven gear 31 are supported by the second output shaft 17 rotatably relative to the second output shaft 17. The fifth speed driven gear 28 is in mesh with the third speed-fifth speed drive gear 19. The seventh speed driven gear 29 is in mesh with the seventh speed drive gear 20. The second speed driven gear 30 is in mesh with the second speed-reverse drive gear 21 and the reverse driven gear 27. The sixth speed driven gear 31 is in mesh with the fourth speed-sixth speed drive gear 22. The fifth speed driven gear 28 and the seventh speed driven gear 29 are capable of being selectively connected to the second output shaft 17 via a fifth speed-seventh speed synchronization apparatus S3. The second speed driven gear 30 and the sixth speed driven gear 31 are capable of being selectively connected to the second output shaft 17 via a second speed-sixth speed synchronization apparatus S4.

A first final drive gear 32 and a second final drive gear 33 are in mesh with a final driven gear 34 of a differential gear D. The first final drive gear 32 is installed fixed to the first output shaft 16. The second final drive gear 33 is installed fixed to the second output shaft 17. Left and right wheels W, W are connected to drive shafts 35, 35 which extend leftward and rightward from the differential gear D, respectively.

Once the first clutch CL1 is engaged, the foregoing configuration transmits the driving force of the crank shaft 11 of the engine E to the first auxiliary input shaft 14 via a path from the torque converter 12 through the main input shaft 13 to the first clutch CL1. Once the second clutch CL2 is engaged, the foregoing configuration transmits the driving force of the crank shaft 11 of the engine E to the second auxiliary input shaft 15 via a path from the torque converter 12 through the main input shaft 13 to the second clutch CL2.

Accordingly, a first speed transmission gear stage is set up, once the first clutch CL1 is engaged while the first speed driven gear 23 is being connected to the first output shaft 16 by shifting the first speed-third speed synchronization apparatus S1 rightward. A second speed transmission gear stage is set up, once the second clutch CL2 is engaged while the second speed driven gear 30 is being connected to the second output shaft 17 by shifting the second speed-sixth speed synchronization apparatus S4 rightward. A third speed transmission gear stage is set up, once the first clutch CL1 is engaged while the third speed driven gear 24 is being connected to the first output shaft 16 by shifting the first speed-third speed synchronization apparatus S1 leftward. A fourth speed transmission gear stage is set up, once the second clutch CL2 is engaged while the fourth speed driven gear 25 is being connected to the first output shaft 16 by shifting the fourth speed-reverse synchronization apparatus S2 leftward. A fifth speed transmission gear stage is set up, once the first clutch CL1 is engaged while the fifth speed driven gear 28 is being connected to the second output shaft 17 by shifting the fifth speed-seventh speed synchronization apparatus S3 leftward. A sixth speed transmission gear stage is set up, once the second clutch CL2 is engaged while the sixth speed driven gear 31 is being connected to the second output shaft 17 by shifting the second speed-sixth speed synchronization apparatus S4 leftward. A seventh speed transmission gear stage is set up, once the first clutch CL1 is engaged while the seventh speed driven gear 29 is being connected to the second output shaft 17 by shifting the fifth speed-seventh speed synchronization apparatus S3 rightward. In addition, a reverse transmission gear stage is set up, once the second clutch CL2 is engaged while the reverse driven gear 27 is being connected to the first output shaft 16 by shifting the fourth speed-reverse synchronization apparatus S2 rightward.

As described above, the shift-up from the first speed transmission gear stage to the seventh speed transmission gear stage is accomplished by repeatedly carrying out operations as follows. While the first speed transmission gear stage is being set up with the engagement of the first clutch CL1, the second speed transmission gear stage is pre-shifted. The second speed transmission gear stage is set up, once the second clutch CL2 is engaged in exchange for the disengagement of the first clutch CL1. While the second speed transmission gear stage is being set up with the engagement of the second clutch CL2, the third speed transmission gear stage is pre-shifted. The third speed transmission gear stage is set up, once the first clutch CL1 is engaged in exchange for the disengagement of the second clutch CL2.

On the other hand, the shift-down from the seventh speed transmission gear stage to the first speed transmission gear stage is accomplished by repeatedly carrying out operations as follows. While the seventh speed transmission gear stage is being set up with the engagement of the first clutch CL1, the sixth speed transmission gear stage is pre-shifted. The sixth speed transmission gear stage is set up, once the second clutch CL2 is engaged in exchange for the disengagement of the first clutch CL1. While the sixth speed transmission gear stage is being set up with the engagement of the second clutch CL2, the fifth speed transmission gear stage is pre-shifted. The fifth speed transmission gear stage is set up, once the first clutch CL1 is engaged in exchange for the disengagement of the second clutch CL2.

These operations enable the shift-up and the shift-down to be performed without interrupting the driving force.

Figure 2:
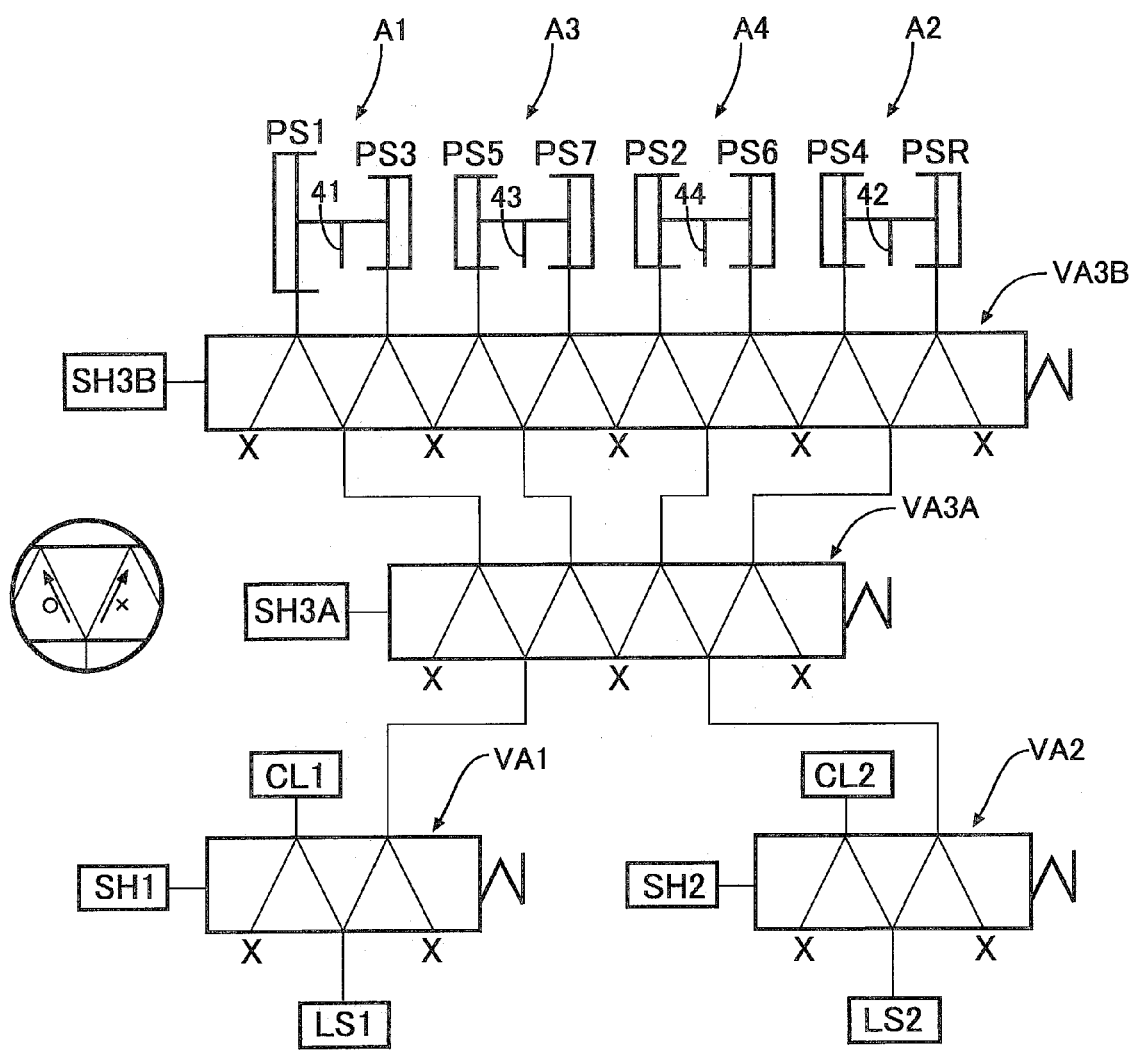
FIG. 2 is a schematic diagram of a hydraulic circuit which lays a basis for the first embodiment.

Next, descriptions will be provided for a basic circuit for a hydraulic circuit for operating the first speed-third speed synchronization apparatus S1, the fourth speed-reverse synchronization apparatus S2, the fifth speed-seventh speed synchronization apparatus S3, and the second speed-sixth speed synchronization apparatus S4 on the basis of FIG. 2. The basic circuit means a hydraulic circuit which lays a basis for a hydraulic circuit to which the present invention is applied.

A first speed-third speed hydraulic actuator A1, a fourth speed-reverse hydraulic actuator A2, a fifth speed-seventh speed hydraulic actuator A3, and a second speed-sixth speed hydraulic actuator A4 are installed in order to operate the first speed-third speed synchronization apparatus S1, the fourth speed-reverse synchronization apparatus S2, the fifth speed-seventh speed synchronization apparatus S3, and the second speed-sixth speed synchronization apparatus S4.

The first speed-third speed hydraulic actuator A1 includes a first speed piston PS1 and a third speed piston PS3 which are placed opposite to each other. The first speed-third speed synchronization apparatus S1 (see FIG. 1) is operated by a shift fork 41 unitary with the two pistons PS1, PS2. The fourth speed-reverse hydraulic actuator A2 includes a fourth speed piston PS4 and a reverse piston PSR which are placed opposite to each other. The fourth speed-reverse synchronization apparatus S2 (see FIG. 1) is operated by a shift fork 42 unitary with the two pistons PS4, PSR. The fifth speed-seventh speed hydraulic actuator A3 includes a fifth speed piston PS5 and a seventh speed piston PS7 which are placed opposite to each other. The fifth speed-seventh speed synchronization apparatus S3 (see FIG. 1) is operated by a shift fork 43 unitary with the two pistons PS5, PS7. The second speed-sixth speed hydraulic actuator A4 includes a second speed piston PS2 and a sixth speed piston PS6 which are placed opposite to each other. The second speed-sixth speed synchronization apparatus S4 (see FIG. 1) is operated by a shift fork 44 unitary with the two pistons PS2, PS6.

The hydraulic circuit includes a first shift valve VA1, a second shift valve VA2, a 3A-numbered shift valve VA3A, and a 3B-numbered shift valve VA3B. The first shift valve VA1 is capable of being located in either of two positions (a ○ position and a x position) with a first shift solenoid SH1. When located in the ○ position, the first shift valve VA1 causes a hydraulic pressure from a first linear solenoid LS1 to flow through a left path, and transmits the hydraulic pressure to the first clutch CL1. When located in the x position, the first shift valve VA1 causes the hydraulic pressure from the first linear solenoid LS1 to flow through a right path, and transmits the hydraulic pressure to the 3A-numbered shift valve VA3A. The second shift valve VA2 is capable of being located in either of two positions (a ○ position and a x position) with a second shift solenoid SH2. When located in the ○ position, the second shift valve VA2 causes a hydraulic pressure from a second linear solenoid LS2 to flow through a left path, and transmits the hydraulic pressure to the second clutch CL2. When located in the x position, the second shift valve VA2 causes the hydraulic pressure from the second linear solenoid LS2 to flow through a right path, and transmits the hydraulic pressure to the 3A-numbered shift valve VA3A.

The 3A-numbered shift valve VA3A is capable of being located in either of two positions (a ○ position and a x position) with a 3A-numbered shift solenoid SH3A. When located in the ○ position, the 3A-numbered shift valve VA3A causes the hydraulic pressures from the first and second shift valves VA1, VA2 to flow through their respective left paths, and transmits the hydraulic pressures to the 3B-numbered shift valve VA3B. When located in the x position, the 3A-numbered shift valve VA3A causes the hydraulic pressures from the first and second shift valves VA1, VA2 to flow through their respective right paths, and transmits the hydraulic pressures to the 3B-numbered shift valve VA3B.

The 3B-numbered shift valve VA3B is capable of being located in either of two positions (a ○ position and a x position) with a 3B-numbered shift solenoid SH3B. When located in the ○ position, the 3B-numbered shift valve VA3B connects the four hydraulic paths from the 3A-numbered shift valve VA3A to left paths, and transmits the corresponding hydraulic pressures to the first, fifth, second and fourth speed pistons PS1, PS5, PS2 and PS4. When located in the x position, the 3B-numbered shift valve VA3B connects the four hydraulic paths from the 3A-numbered shift valve VA3A to right paths, and transmits the corresponding hydraulic pressures to the third, seventh, sixth speed and reverse pistons PS3, PS7, PS6 and PSR.

The first shift valve VA1 and the second shift valve VA2 are configured to be basically located in the mutually reverse positions except for during gear shift or at the time of failure to be described later. While the first shift valve VA1 is located in the ○ position, the second shift valve VA2 is located in the x position. While the first shift valve VA1 is located in the x position, the second shift valve VA2 is located in the ○ position.

Once the first shift valve VA1 transmits the hydraulic pressure from the first linear solenoid LS1 to the 3A-numbered shift valve VA3A while located in the x position, the hydraulic pressure is selectively distributed to four lines by the 3A-numbered shift valve VA3A and the 3B-numbered shift valve VA3B, and is thus transmitted to the first, third, fifth and seventh speed pistons PS1, PS3, PS5, PS7 for the purpose of pre-shifting the odd-numbered speed transmission gear stages. On this occasion, the second shift valve VA2 is located in the ○ position, and thus transmits the hydraulic pressure from the second linear solenoid LS2 to the second clutch CL2.

Once the second shift valve VA2 transmits the hydraulic pressure from the second linear solenoid LS2 to the 3A-numbered shift valve VA3A while located in the x position, the hydraulic pressure is selectively distributed to the other four lines by the 3A-numbered shift valve VA3A and the 3B-numbered shift valve VA3B, and is thus transmitted to the second, sixth, fourth speed and reverse pistons PS2, PS6, PS4, PSR for the purpose of pre-shifting the even-numbered speed transmission gear stages and the reverse transmission gear stage. On this occasion, the first shift valve VA1 is located in the ○ position, and thus transmits the hydraulic pressure from the first linear solenoid LS1 to the first clutch CL1.

For this reason, in a case where the first clutch CL1 is engaged due to the hydraulic pressure from the first linear solenoid LS1 while the first shift valve VA1 is located in the ○ position, that is to say, in a case where one of the odd-numbered speed transmission gear stages is set up, the second shift valve VA2 is located in the x position, and the hydraulic pressure from the second linear solenoid LS2 thus operates one of the second, sixth, fourth speed and reverse pistons PS2, PS6, PS4, PSR via the 3A-numbered shift valve VA3A and the 3B-numbered shift valve VA3B. Thereby, the hydraulic pressure from the second linear solenoid LS2 pre-shifts one of the even-numbered speed and reverse transmission gear stages. Conversely, in a case where the second clutch CL2 is engaged due to the hydraulic pressure from the second linear solenoid LS2 while the second shift valve VA2 is located in the ○ position, that is to say, in a case where one of the even-numbered speed or reverse transmission gear stages is set up, the first shift valve VA1 is located in the x position, and the hydraulic pressure from the first linear solenoid LS1 thus operates one of the first, third, fifth and seventh speed pistons PS1, PS3, PS5, PS7 via the 3A-numbered shift valve VA3A and the 3B-numbered shift valve VA3B. Thereby, the hydraulic pressure from the first linear solenoid LS1 pre-shifts one of the odd-numbered speed transmission gear stages.

Figure 3:
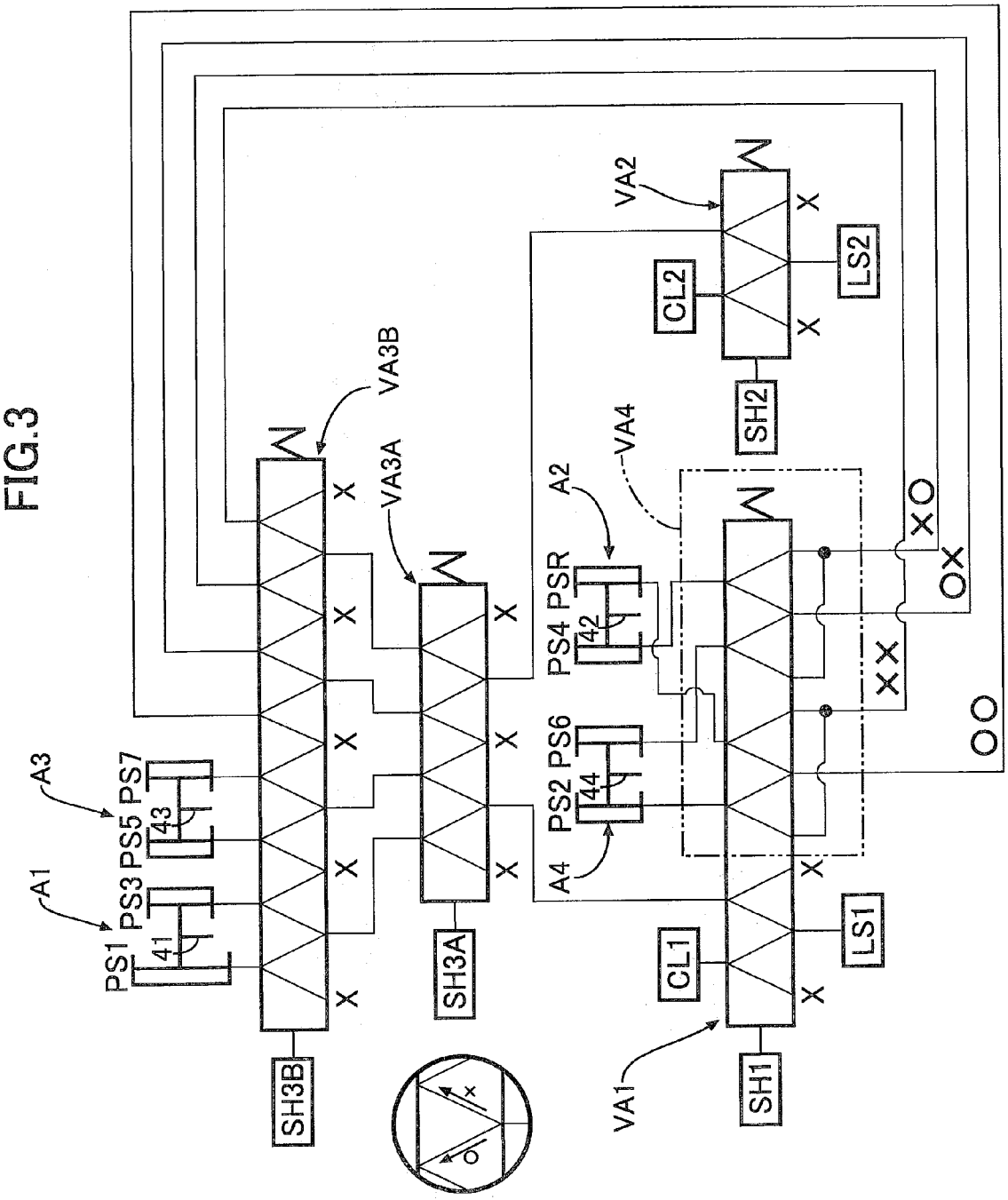
FIG. 3 is a schematic diagram of a hydraulic circuit according to the first embodiment.

FIG. 3 shows a hydraulic circuit according to the present invention, which is a modification of the basic hydraulic circuit shown in FIG. 2.

As clear from comparison between FIG. 2 and FIG. 3, the hydraulic circuit shown in FIG. 3 is different from the basic hydraulic circuit shown in FIG. 2 in that: the 3B-numbered shift valve VA3B is directly connected to none of the second, sixth, fourth speed and reverse pistons PS2, PS6, PS4, PSR; a fourth shift valve VA4 formed unitarily with the first shift valve VA1 intervenes between the 3B-numbered shift valve VA3B and each of the second, sixth, fourth speed and reverse pistons PS2, PS6, PS4, PSR.

Figure 4B:
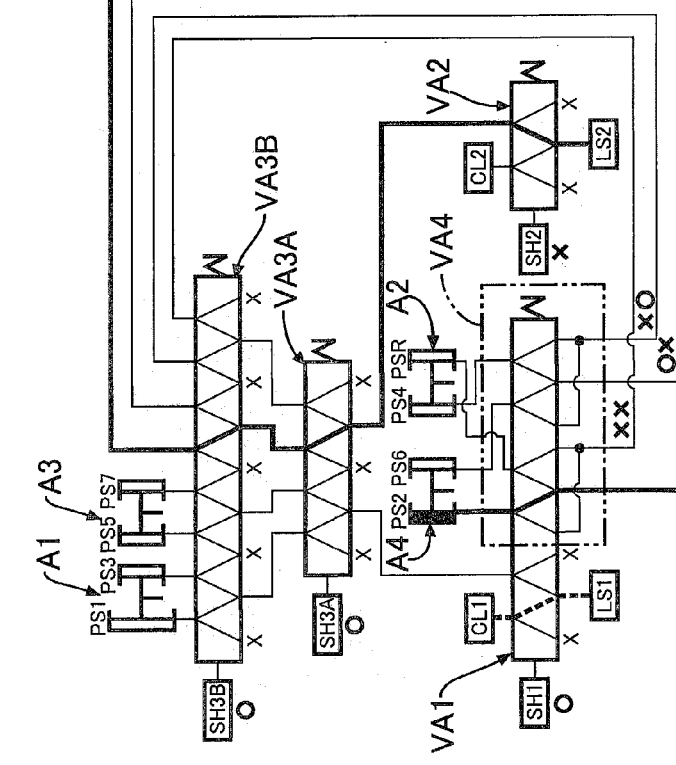
FIGS. 4A and 4B are diagrams for explaining operations which are carried out when a second speed transmission gear stage is pre-shifted according to the first embodiment, respectively.
Figure 4A:
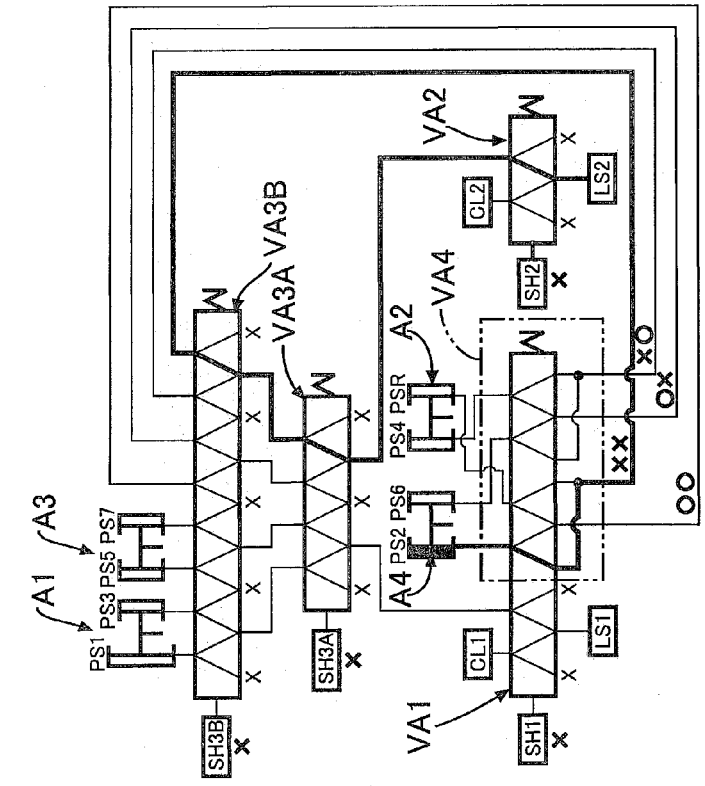

As shown in FIG. 4A, the first shift valve VA1 (and the fourth shift valve VA4) is located in the ○ position, the second shift valve VA2 is located in the x position, the 3A-numbered shift valve VA3 is located in the ○ position, and the 3B-numbered shift valve VA3B is located in the ○ position. On this occasion, the hydraulic pressure is transmitted from the second linear solenoid LS2 to the second speed piston PS2, and the second speed transmission gear stage is pre-shifted. Concurrently, the first shift valve VA1 is located in the ○ position, and the first clutch CL1 is engaged due to the hydraulic pressure from the first linear solenoid LS1.

If the 3A-numbered shift valve VA3A or the 3B-numbered shift valve VA3B goes out of order, only two of the second, fourth and sixth speed and reverse transmission gear stages remain capable of being pre-shifted, and the other two of the second, fourth and sixth speed and reverse transmission gear stages become incapable of being pre-shifted.

To put it specifically, if the 3A-numbered shift valve VA3A is fixed in the ○ position, only the second and sixth speed transmission gear stages remain capable of being pre-shifted, and the fourth speed and reverse transmission gear stages become incapable of being pre-shifted. If the 3A-numbered shift valve VA3A is fixed in the x position, only the fourth speed and reverse transmission gear stages remain capable of being pre-shifted, and the second and sixth speed transmission gear stages become incapable of being pre-shifted. If the 3B-numbered shift valve VA3B is fixed in the ○ position, only the second and fourth speed transmission gear stages remain capable of being pre-shifted, and the sixth speed and reverse transmission gear stages become incapable of being pre-shifted. If the 3B-numbered shift valve VA3B is fixed in the x position, only the sixth speed and reverse transmission gear stages remain capable of being pre-shifted, and the second and fourth speed transmission gear stages become incapable of being pre-shifted.

Descriptions will be hereinbelow provided for an operation which the hydraulic circuit according to the present embodiment carries out when the 3A-numbered shift valve VA3A or the 3B-numbered shift valve VA3B goes out of order.

In a case where the 3A-numbered shift valve VA3A or the 3B-numbered shift valve VA3B goes out of order and becomes out of operation, for instance, if the 3A-numbered shift valve VA3A cannot be located in the ○ position, or if the 3B-numbered shift valve VA3B cannot be located in the ○ position, the hydraulic pressure can no longer be supplied to the second speed piston PS2, and the second speed transmission gear stage can no longer be pre-shifted. In such a case, the hydraulic circuit according to the present embodiment reverses the logic concerning the position of the 3A-numbered shift valve VA3A and the position of the 3B-numbered shift valve VA3B from ○/○ to x/x. Even in the case where the 3A-numbered shift valve VA3A or the 3B-numbered shift valve VA3B goes out of order, it is possible to locate the 3A-numbered shift valve VA3A in the x position and the 3B-numbered shift valve VA3B in the x position. In addition, the hydraulic circuit according to the present embodiment switches the first shift valve VA1, which has been located in the current ○ position, to the x position.

The reason why the logic concerning the position of the 3A-numbered shift valve VA3A and the position of the 3B-numbered shift valve VA3B is reversed is that, even in the case where the 3A-numbered shift valve VA3A and the 3B-numbered shift valve VA3B go out of order and become incapable of being controlled to be located in the respective desired positions, the 3A-numbered shift valve VA3A and the 3B-numbered shift valve VA3B still remain capable of being controlled to be located in the respective positions which result from the reverse of the logic. Note that the simple reverse of the logic makes the hydraulic pressure incapable of being supplied to the second speed piston PS2. However, when the first shift valve VA1, which has been located in the ○ position, is switched to the x position in addition to the reverse of the logic, the hydraulic paths are switched, and the hydraulic pressure accordingly becomes capable of being supplied to the second speed piston PS2.

In other words, once the first shift valve VA1, which has been located in the ○ position, is switched to the x position, the fourth shift valve VA4 unitary with the first shift valve VA1 is switched to the x position, too. In normal working condition, the fourth shift valve VA4 located in the ○ position supplies the hydraulic pressure from the 3A-numbered shift valve VA3A located in the ○ position and the 3B-numbered shift valve VA3B located in the ○ position to the second speed piston PS2. In failure condition, the fourth shift valve VA4 switched to the x position supplies the hydraulic pressure from the 3A-numbered shift valve VA3A located in the x position and the 3B-numbered shift valve VA3B located in the x position to the second speed piston PS2.

As a consequence, as shown in FIG. 4B, the hydraulic pressure from the second linear solenoid LS2 is transmitted to the second speed piston PS2 via the second shift valve VA2, the 3A-numbered shift valve VA3A, the 3B-numbered shift valve VA3B and the fourth shift valve VA4. This makes the second speed transmission gear stage capable of being pre-shifted, even while the 3A-numbered shift valve VA3A or the 3B-numbered shift valve VA3B is out of order.

Figure 5A:
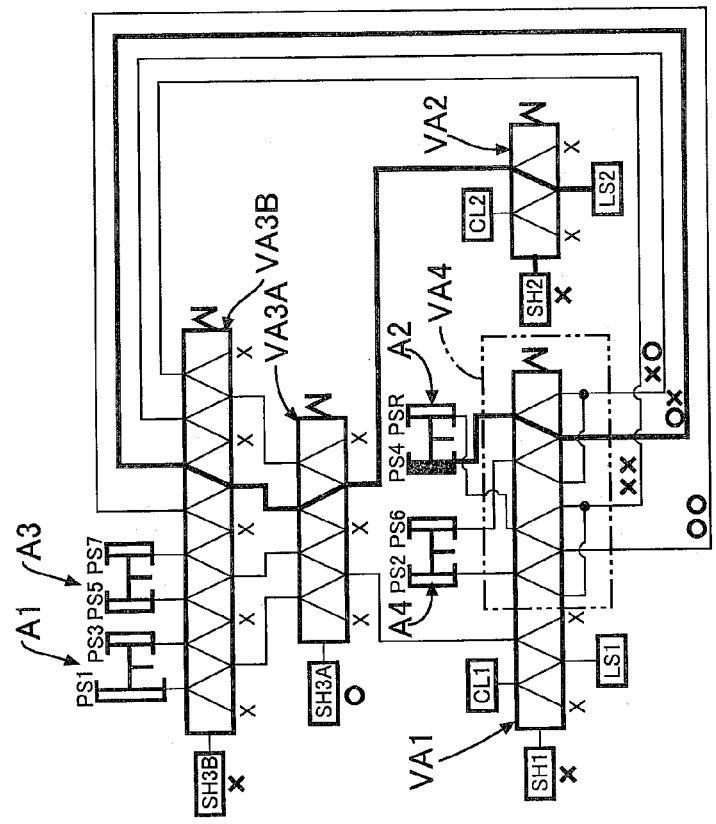
FIGS. 5A and 5B are diagrams for explaining operations which are carried out when a fourth speed transmission gear stage is pre-shifted according to the first embodiment, respectively.

As shown in FIG. 5A, the first shift valve VA1 (and the fourth shift valve VA4) is located in the ○ position, the second shift valve VA2 is located in the x position, the 3A-numbered shift valve VA3 is located in the x position, and the 3B-numbered shift valve VA3B is located in the ○ position. On this occasion, the hydraulic pressure is transmitted from the second linear solenoid LS2 to the fourth speed piston PS4, and the fourth speed transmission gear stage is pre-shifted. Concurrently, the first shift valve VA1 is located in the ○ position, and the first clutch CL1 is engaged due to the hydraulic pressure from the first linear solenoid LS1.

In a case where the 3A-numbered shift valve VA3A or the 3B-numbered shift valve VA3B goes out of order and becomes out of operation, for instance, if the 3A-numbered shift valve VA3A cannot be located in the x position, or if the 3B-numbered shift valve VA3B cannot be located in the ○ position, the hydraulic pressure can no longer be supplied to the fourth speed piston PS4, and the fourth speed transmission gear stage can no longer be pre-shifted. In such a case, the hydraulic circuit according to the present embodiment reverses the logic concerning the position of the 3A-numbered shift valve VA3A and the position of the 3B-numbered shift valve VA3B from x/○ to ○/x. Even in the case where the 3A-numbered shift valve VA3A or the 3B-numbered shift valve VA3B goes out of order, it is possible to locate the 3A-numbered shift valve VA3A in the ○ position and the 3B-numbered shift valve VA3B in the x position. In addition, the hydraulic circuit according to the present embodiment switches the first shift valve VA1, which has been located in the current ○ position, to the x position.

The reason why the logic concerning the position of the 3A-numbered shift valve VA3A and the position of the 3B-numbered shift valve VA3B is reversed is that, even in the case where the 3A-numbered shift valve VA3A and the 3B-numbered shift valve VA3B go out of order and become incapable of being controlled to be located in the respective desired positions, the 3A-numbered shift valve VA3A and the 3B-numbered shift valve VA3B still remain capable of being controlled to be located in the respective positions which result from the reverse of the logic. Note that the simple reverse of the logic makes the hydraulic pressure incapable of being supplied to the fourth speed piston PS4. However, when the first shift valve VA1, which has been located in the ○ position, is switched to the x position in addition to the reverse of the logic, the hydraulic paths are switched, and the hydraulic pressure accordingly becomes capable of being supplied to the fourth speed piston PS4.

In other words, once the first shift valve VA1, which has been located in the ○ position, is switched to the x position, the fourth shift valve VA4 unitary with the first shift valve VA1 is switched to the x position, too. In normal working condition, the fourth shift valve VA4 located in the ○ position supplies the hydraulic pressure from the 3A-numbered shift valve VA3A located in the x position and the 3B-numbered shift valve VA3B located in the ○ position to the fourth speed piston PS4. In failure condition, the fourth shift valve VA4 switched to the x position supplies the hydraulic pressure from the 3A-numbered shift valve VA3A located in the ○ position and the 3B-numbered shift valve VA3B located in the x position to the fourth speed piston PS4.

Figure 5B:
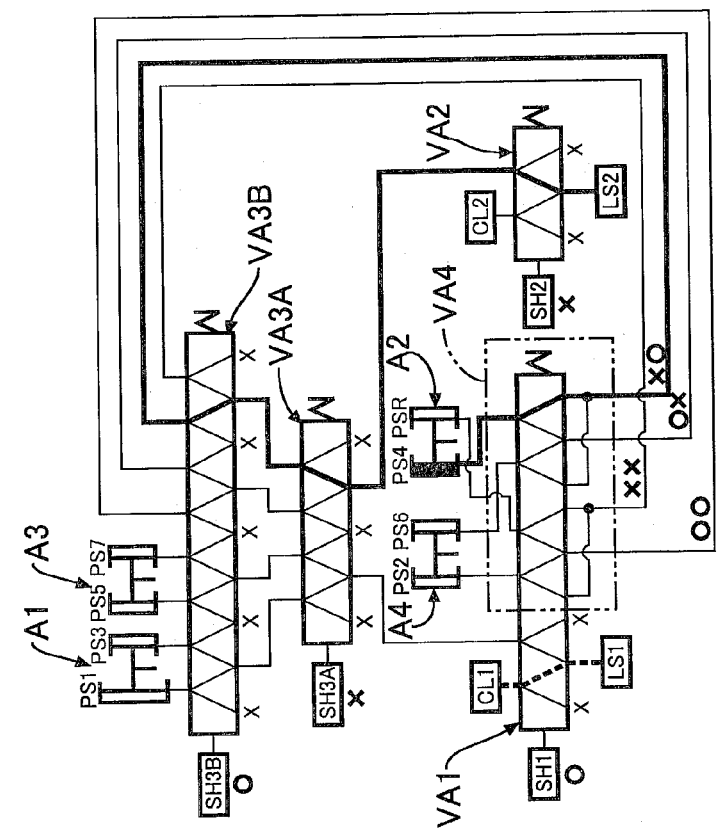

As a consequence, as shown in FIG. 5B, the hydraulic pressure from the second linear solenoid LS2 is transmitted to the fourth speed piston PS4 via the second shift valve VA2, the 3A-numbered shift valve VA3A, the 3B-numbered shift valve VA3B and the fourth shift valve VA4. This makes the fourth speed transmission gear stage capable of being pre-shifted, even while the 3A-numbered shift valve VA3A or the 3B-numbered shift valve VA3B is out of order.

Figure 6A:
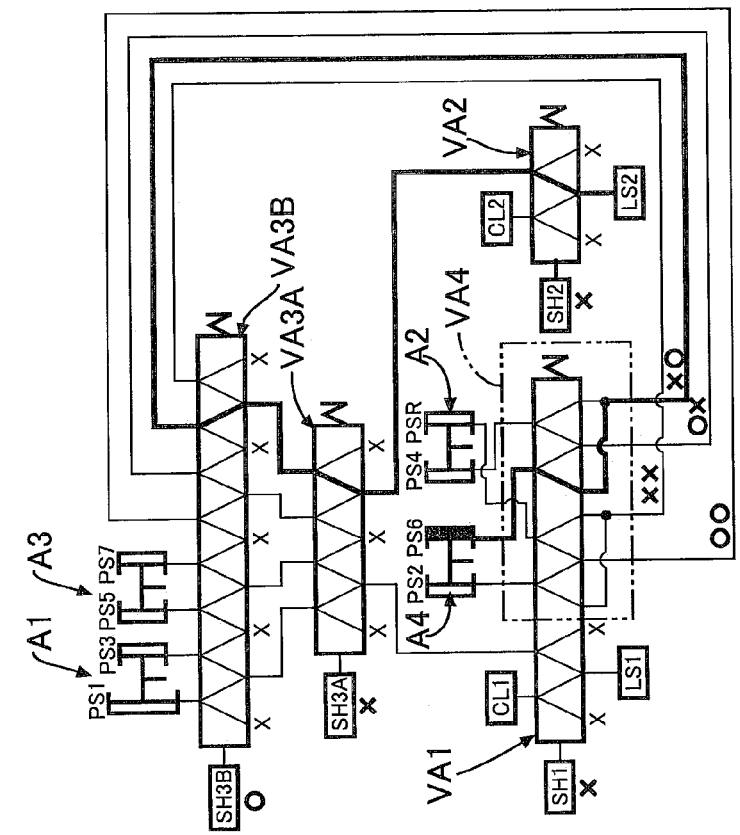
FIGS. 6A and 6B are diagrams for explaining operations which are carried out when a sixth speed transmission gear stage is pre-shifted according to the first embodiment, respectively.

As shown in FIG. 6A, the first shift valve VA1 (and the fourth shift valve VA4) is located in the ○ position, the second shift valve VA2 is located in the x position, the 3A-numbered shift valve VA3 is located in the ○ position, and the 3B-numbered shift valve VA3B is located in the x position. On this occasion, the hydraulic pressure is transmitted from the second linear solenoid LS2 to the sixth speed piston PS6, and the sixth speed transmission gear stage is pre-shifted. Concurrently, the first shift valve VA1 is located in the ○ position, and the first clutch CL1 is engaged due to the hydraulic pressure from the first linear solenoid LS1.

In a case where the 3A-numbered shift valve VA3A or the 3B-numbered shift valve VA3B goes out of order and becomes out of operation, for instance, if the 3A-numbered shift valve VA3A cannot be located in the ○ position, or if the 3B-numbered shift valve VA3B cannot be located in the x position, the hydraulic pressure can no longer be supplied to the sixth speed piston PS6, and the sixth speed transmission gear stage can no longer be pre-shifted. In such a case, the hydraulic circuit according to the present embodiment reverses the logic concerning the position of the 3A-numbered shift valve VA3A and the position of the 3B-numbered shift valve VA3B from ○/x to x/○. Even in the case where the 3A-numbered shift valve VA3A or the 3B-numbered shift valve VA3B goes out of order, it is possible to locate the 3A-numbered shift valve VA3A in the x position and the 3B-numbered shift valve VA3B in the ○ position. In addition, the hydraulic circuit according to the present embodiment switches the first shift valve VA1, which has been located in the current ○ position, to the x position.

The reason why the logic concerning the position of the 3A-numbered shift valve VA3A and the position of the 3B-numbered shift valve VA3B is reversed is that, even in the case where the 3A-numbered shift valve VA3A and the 3B-numbered shift valve VA3B go out of order and become incapable of being controlled to be located in the respective desired positions, the 3A-numbered shift valve VA3A and the 3B-numbered shift valve VA3B still remain capable of being controlled to be located in the respective positions which result from the reverse of the logic. Note that the simple reverse of the logic makes the hydraulic pressure incapable of being supplied to the sixth speed piston PS6. However, when the first shift valve VA1, which has been located in the ○ position, is switched to the x position in addition to the reverse of the logic, the hydraulic paths are switched, and the hydraulic pressure accordingly becomes capable of being supplied to the sixth speed piston PS6.

In other words, once the first shift valve VA1, which has been located in the ○ position, is switched to the x position, the fourth shift valve VA4 unitary with the first shift valve VA1 is switched to the x position, too. In normal working condition, the fourth shift valve VA4 located in the ○ position supplies the hydraulic pressure from the 3A-numbered shift valve VA3A located in the ○ position and the 3B-numbered shift valve VA3B located in the x position to the sixth speed piston PS6. In failure condition, the fourth shift valve VA4 switched to the x position supplies the hydraulic pressure from the 3A-numbered shift valve VA3A located in the x position and the 3B-numbered shift valve VA3B located in the ○ position to the sixth speed piston PS6.

Figure 6B:
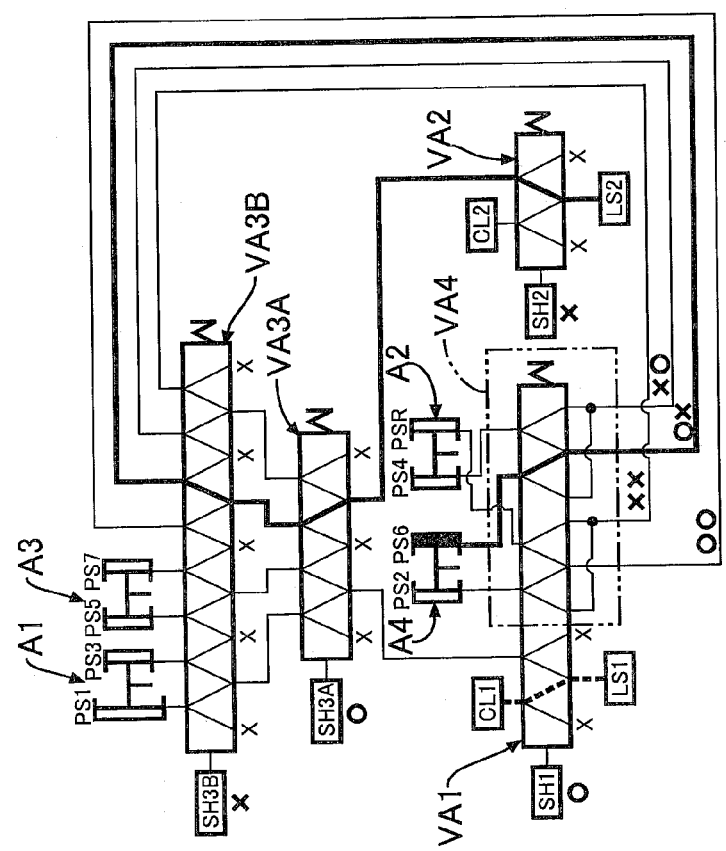

As a consequence, as shown in FIG. 6B, the hydraulic pressure from the second linear solenoid LS2 is transmitted to the sixth speed piston PS6 via the second shift valve VA2, the 3A-numbered shift valve VA3A, the 3B-numbered shift valve VA3B and the fourth shift valve VA4. This makes the sixth speed transmission gear stage capable of being pre-shifted, even while the 3A-numbered shift valve VA3A or the 3B-numbered shift valve VA3B is out of order.

As shown in FIG. 7A, the first shift valve VA1 (and the fourth shift valve VA4) is located in the ○ position, the second shift valve VA2 is located in the x position, the 3A-numbered shift valve VA3 is located in the x position, and the 3B-numbered shift valve VA3B is located in the x position. On this occasion, the hydraulic pressure is transmitted from the second linear solenoid LS2 to the reverse piston PSR, and the reverse transmission gear stage is pre-shifted. Concurrently, the first shift valve VA1 is located in the o position, and the first clutch CL1 is engaged due to the hydraulic pressure from the first linear solenoid LS1.

In a case where the 3A-numbered shift valve VA3A or the 3B-numbered shift valve VA3B goes out of order and becomes out of operation, for instance, if the 3A-numbered shift valve VA3A cannot be located in the x position, or if the 3B-numbered shift valve VA3B cannot be located in the x position, the hydraulic pressure can no longer be supplied to the reverse piston PSR, and the reverse transmission gear stage can no longer be pre-shifted. In such a case, the hydraulic circuit according to the present embodiment reverses the logic concerning the position of the 3A-numbered shift valve VA3A and the position of the 3B-numbered shift valve VA3B from x/x to o/o. Even in the case where the 3A-numbered shift valve VA3A or the 3B-numbered shift valve VA3B goes out of order, it is possible to locate the 3A-numbered shift valve VA3A in the o position and the 3B-numbered shift valve VA3B in the o position. In addition, the hydraulic circuit according to the present embodiment switches the first shift valve VA1, which has been located in the current o position, to the x position.

The reason why the logic concerning the position of the 3A-numbered shift valve VA3A and the position of the 3B-numbered shift valve VA3B is reversed is that, even in the case where the 3A-numbered shift valve VA3A and the 3B-numbered shift valve VA3B go out of order and become incapable of being controlled to be located in the respective desired positions, the 3A-numbered shift valve VA3A and the 3B-numbered shift valve VA3B still remain capable of being controlled to be located in the respective positions which result from the reverse of the logic. Note that the simple reverse of the logic makes the hydraulic pressure incapable of being supplied to the reverse piston PSR. However, when the first shift valve VA1, which has been located in the o position, is switched to the x position in addition to the reverse of the logic, the hydraulic paths are switched, and the hydraulic pressure accordingly becomes capable of being supplied to the reverse piston PSR.

In other words, once the first shift valve VA1, which has been located in the o position, is switched to the x position, the fourth shift valve VA4 unitary with the first shift valve VA1 is switched to the x position, too. In normal working condition, the fourth shift valve VA4 located in the o position supplies the hydraulic pressure from the 3A-numbered shift valve VA3A located in the x position and the 3B-numbered shift valve VA3B located in the x position to the reverse piston PSR. In failure condition, the fourth shift valve VA4 switched to the x position supplies the hydraulic pressure from the 3A-numbered shift valve VA3A located in the o position and the 3B-numbered shift valve VA3B located in the o position to the reverse piston PSR.

As a consequence, as shown in FIG. 7B, the hydraulic pressure from the second linear solenoid LS2 is transmitted to the reverse piston PSR via the second shift valve VA2, the 3A-numbered shift valve VA3A, the 3B-numbered shift valve VA3B and the fourth shift valve VA4. This makes the reverse transmission gear stage capable of being pre-shifted, even while the 3A-numbered shift valve VA3A or the 3B-numbered shift valve VA3B is out of order.

When the 3A-numbered shift valve VA3A or the 3B-numbered shift valve VA3B, as described above, goes out of order, the first shift valve VA1, which is located in the o position in normal working condition, needs to be operated in order that the first shift valve VA1 can be located in the x position. For this reason, the first clutch CL1 cannot be engaged, and the odd-numbered speed transmission gear stages can not be set up. Nevertheless, in failure condition, the vehicle is caused to run with one of the even-numbered speed and reverse transmission gear stages without using any one of the odd numbered speed transmission gear stages. For this reason, it does not matter if the first shift valve VA1 is operated in order to be located in the x position.

Figure 8:
FIG. 8 is a diagram showing positions in which the respective shift valves are located during each of normal working condition and failure condition.

As shown in FIGS. 8 and 10, while the first shift valve VA1 is located in the o position in normal working condition, if the 3A-numbered shift valve VA3A and the 3B-numbered shift valve VA3B are located in the o/o positions, the second speed transmission gear stage is pre-shifted. If the 3A-numbered shift valve VA3A and the 3B-numbered shift valve VA3B are located in the x/o positions, the fourth speed transmission gear stage is pre-shifted. If the 3A-numbered shift valve VA3A and the 3B-numbered shift valve VA3B are located in the o/x positions, the sixth speed transmission gear stage is pre-shifted. If the 3A-numbered shift valve VA3A and the 3B-numbered shift valve VA3B are located in the x/x positions, the reverse transmission gear stage is pre-shifted. On the other hand, in failure condition, the first shift valve VA1 is switched from the o position to the x position, and the logic of the 3A-numbered shift valve VA3A and the 3B-numbered shift valve VA3B is reversed. Accordingly, if the 3A-numbered shift valve VA3A and the 3B-numbered shift valve VA3B are located in the x/x positions, the second speed transmission gear stage is pre-shifted. If the 3A-numbered shift valve VA3A and the 3B-numbered shift valve VA3B are located in the o/x positions, the fourth speed transmission gear stage is pre-shifted. If the 3A-numbered shift valve VA3A and the 3B-numbered shift valve VA3B are located in the x/o positions, the sixth speed transmission gear stage is pre-shifted. If the 3A-numbered shift valve VA3A and the 3B-numbered shift valve VA3B are located in the o/o positions, the reverse transmission gear stage is pre-shifted.

Note that reference sign "SHLC" in FIG. 10 denotes a lockup clutch solenoid SHLC (see FIG. 12) for operating a lockup clutch shift valve 61, which will be described later.

As described above, the present embodiment enables one of the second, fourth, sixth speed and reverse transmission gear stages to be set up even when the 3A-numbered shift valve VA3A or the 3B-numbered shift valve VA3B goes out of order. Accordingly, the present embodiment can secure a minimum necessary capability of the vehicle to run to a service shop. In addition, the present embodiment can keep the increase in the number of parts and costs to a minimum, because the present embodiment drives the fourth shift valve VA4 by use of the existing first shift solenoid SH1 for driving the existing first shift valve VA1.

Here, in normal working condition, the present embodiment achieves continuous shift-up and shift-down involving the uninterrupted driving force by repeatedly sequentially carrying out: the pre-shifting of an even-numbered speed transmission gear stage while the first clutch CL1 is being engaged; the setting up of the even-numbered speed transmission gear stage by switching the first clutch CL1 to the second clutch CL2; the pre-shifting of an odd-numbered speed transmission gear stage while the second clutch CL2 is being engaged; and the setting up of the odd-numbered speed transmission gear stage by switching the second clutch CL2 to the first clutch CL1. However, in failure condition, the present embodiment causes the vehicle to run with the second clutch CL2 being engaged by locating the second shift valve VA2 in the o position, and pre-shifts the corresponding speed transmission gear stage in exchange for the disengagement of the second clutch CL2 by locating the second shift valve VA2 in the x position. For this reason, the driving force cannot be transmitted while the speed transmission gear stage is being pre-shifted, and thus the transmission of the driving force is inevitably interrupted due to the shift change.

Furthermore, the present embodiment secures the running capability of the vehicle by enabling one of the second, fourth, sixth speed and reverse transmission gear stages to be set up in failure condition. In this respect, if the fourth shift valve VA4 is provided unitary with the second shift valve VA2 instead of the first shift valve VA1, the present embodiment makes it possible for the vehicle to run by setting up one of the first, third, fifth and seventh speed transmission gear stages in failure condition. In this case, however, the reverse transmission gear stage is incapable of being set up, and this incapability may cause troubles on the running of the vehicle. With this taken into consideration, the present embodiment employs the former configuration.

Figure 9:
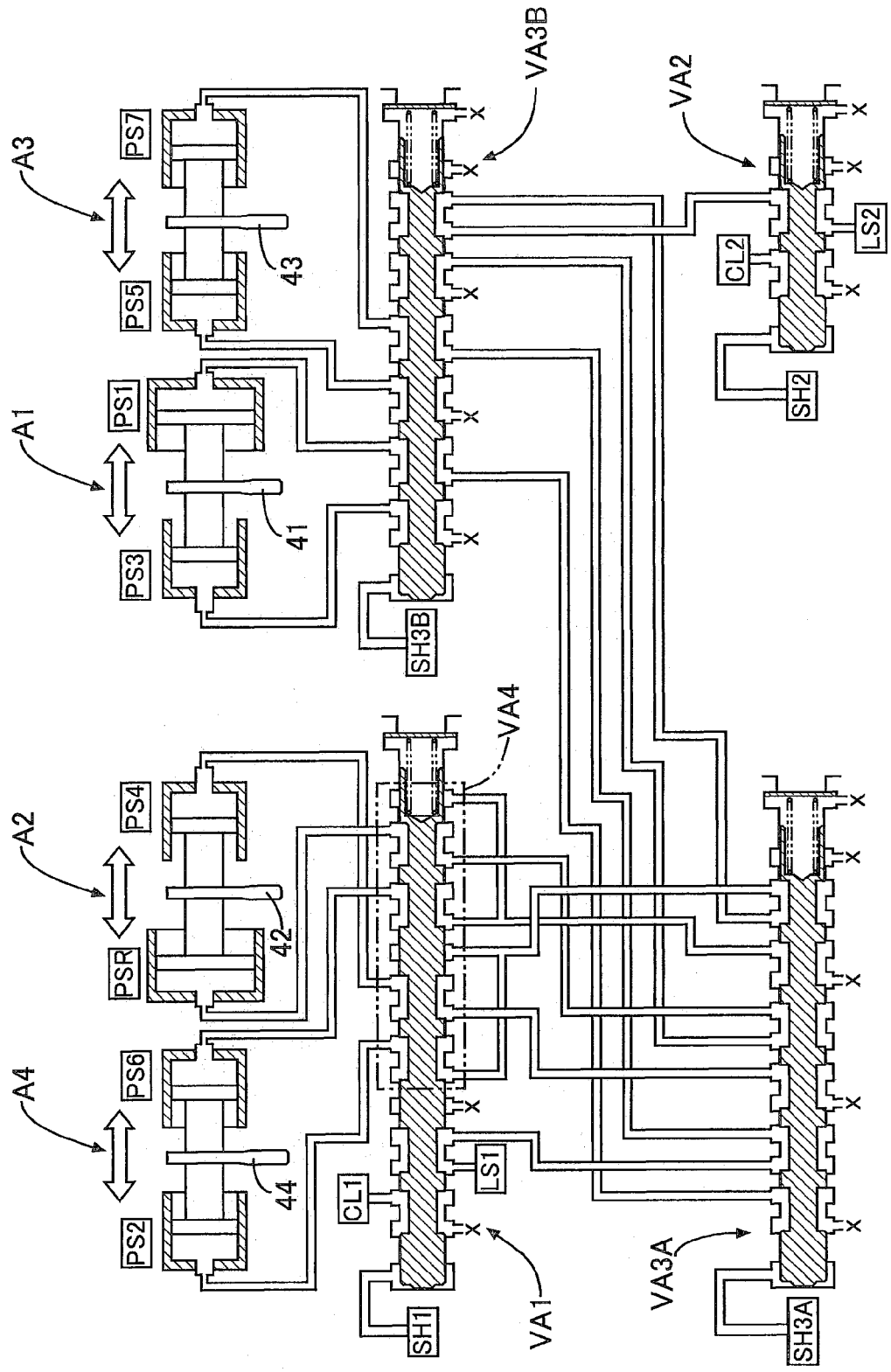
FIG. 9 is a diagram showing the hydraulic circuit according to the first embodiment of the present invention.

FIG. 9 shows a hydraulic circuit in which the hydraulic circuit schematically shown in FIG. 3 is embodied.

As clear from FIG. 9, a spool of the fourth shift valve VA4 is formed integrally with a right end of a spool of the first shift valve VA1, and the first shift valve VA1 and the fourth shift valve VA4 are configured to be integrally driven by the first shift solenoid SH1. This integral formation of the first shift valve VA1 and the fourth shift valve VA4 can contribute to the reduction in the number of parts.

Next, descriptions will be provided for a second embodiment on the basis of FIGS. 11 to 16.

Figure 11:
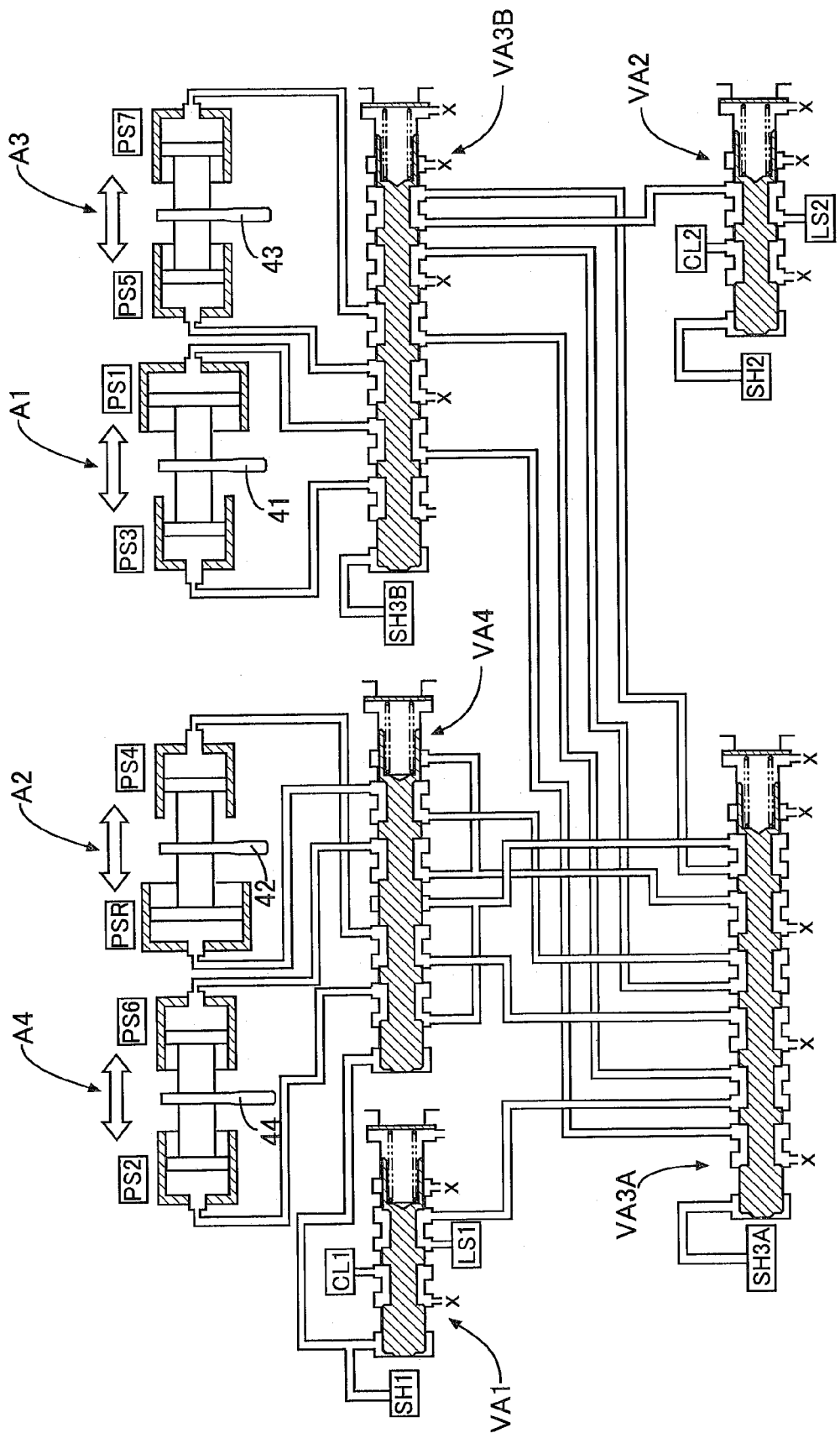
FIG. 11 is a diagram showing a hydraulic circuit according to a second embodiment.

In the first embodiment, the first shift valve VA1 and the fourth shift valve VA4 are formed integrally. In addition, the first shift valve VA1 and the fourth valve VA4 are driven together by the first shift solenoid SH1. In the second embodiment, as shown in FIG. 11, the fourth shift valve VA4 is formed as a body independent of the first shift valve VA1. However, the fourth shift valve VA4 operates integrally with the first shift valve VA1 because the fourth shift valve VA4 is connected to the first shift solenoid SH1 via a hydraulic path.

In the first embodiment, what is obtained by integrating the first shift valve VA1 and the fourth shift valve VA4 together is too long, and this excessive length may be an obstacle to the housing of the first shift valve VA1 and the fourth shift valve VA4 in a valve block. In the second embodiment, the separation of the first shift valve VA1 and the fourth valve VA4 makes it easy to house the first shift valve VA1 and the fourth shift valve VA4 in the valve block.

Figure 12:
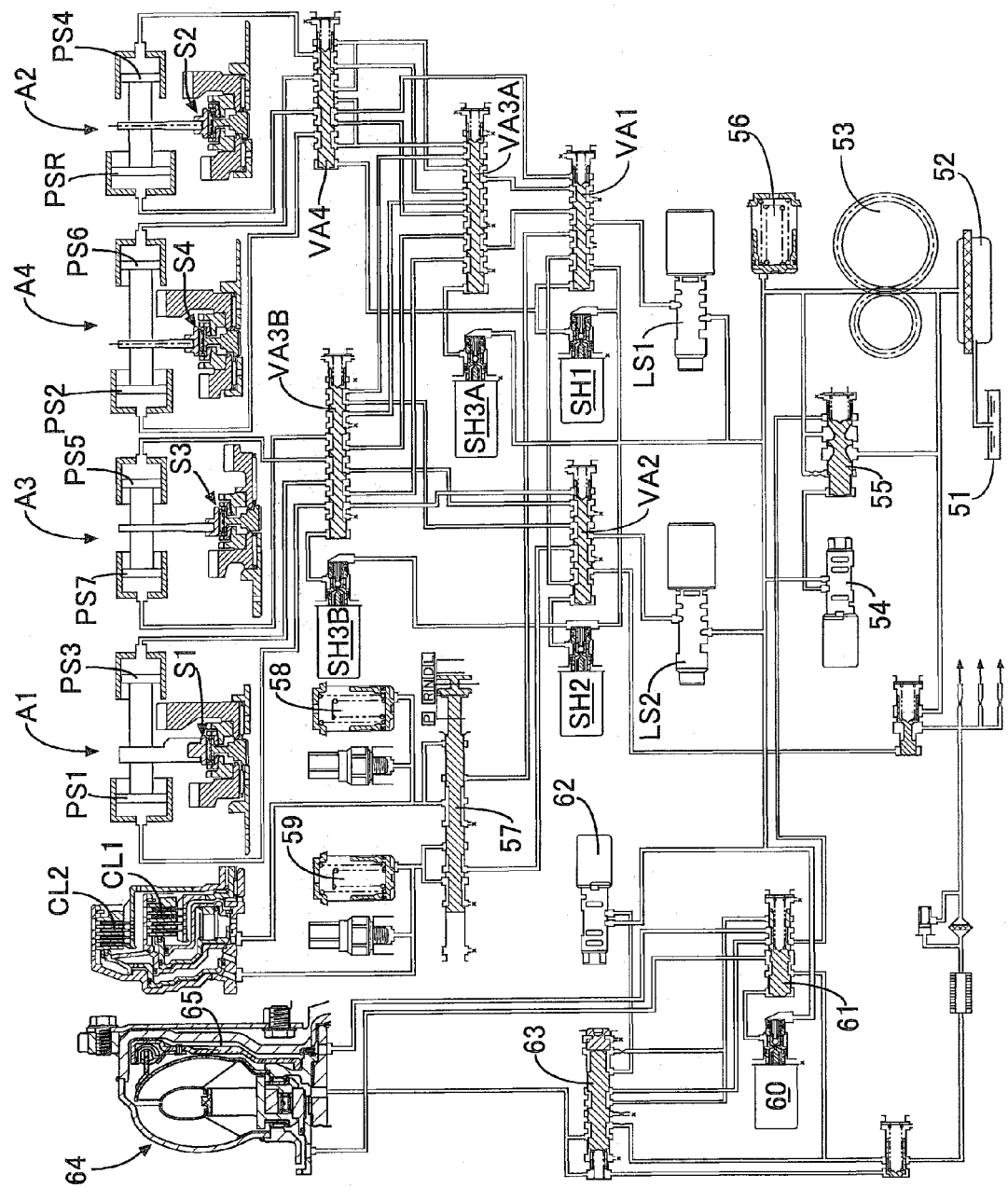
FIG. 12 is a diagram showing an overall hydraulic circuit for an automatic transmission according the second embodiment.

FIG. 12 shows an overall hydraulic circuit for the automatic transmission T, which includes the hydraulic circuit shown in FIG. 11. Descriptions will be hereinbelow provided for the overall hydraulic circuit.

Oil is drawn from an oil pan 51 with an oil pump 53 through a strainer 52, and the pressure of the oil is regulated by a regulator valve 55, which is controlled by a linear solenoid 54, in order that the pressure of the oil can be equal to a line pressure. Thus, the regulated pressure thereof is accumulated in an accumulator 56.

The line pressure is regulated by the first linear solenoid LS1 and the second linear solenoid LS2. The regulated line pressure is supplied to first to fourth actuators A1 to A4 via the 3A-numbered shift valve VA3A, the 3B-numbered shift valve VA3B and the fourth shift valve VA4. The regulated line pressure is finally supplied to the pre-shift of each transmission gear stage.

A clutch control oil path extending from the first shift valve VA1 passes a manual valve 57, and is connected to the first clutch CL1. A clutch control oil path extending from the second shift valve VA2 passes the manual valve 57, and is connected to the second clutch CL2. An accumulator 58 is installed between the manual valve 57 and the first clutch CL1, and an accumulator 59 is installed between the manual valve 57 and the second clutch CL2.

The line pressure is supplied to a lockup clutch 65 in a torque converter 64 via the lockup clutch shift valve 61 and a lockup clutch control valve 63. The lockup clutch shift valve 61 is operated by the lockup clutch solenoid SHLC. The lockup clutch control valve 63 is controlled by a linear solenoid 62.

Figure 13:
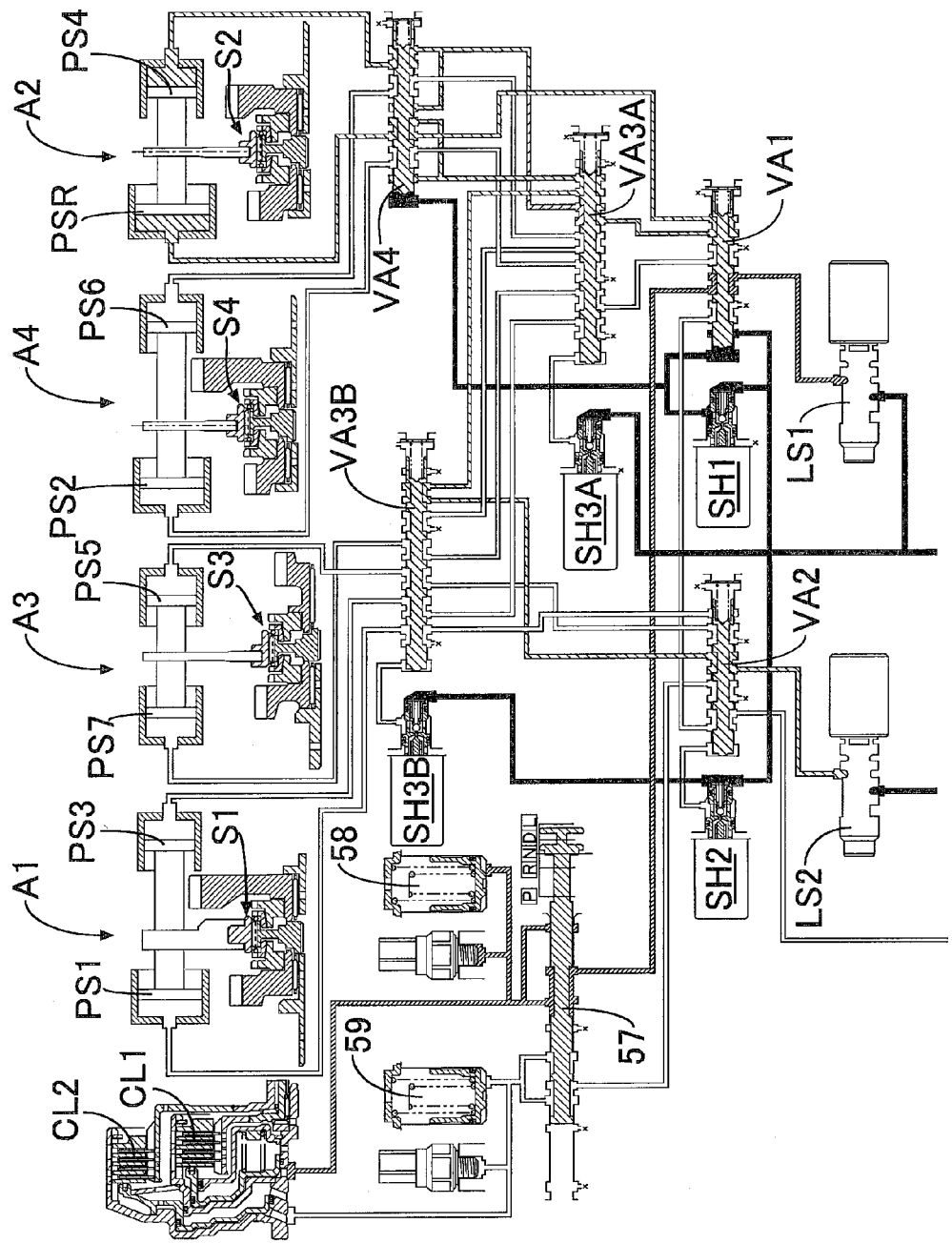
FIG. 13 is a diagram showing the hydraulic circuit according to the second embodiment, which pre-shifts an even-numbered speed transmission gear stage while a vehicle is running with an odd-numbered speed transmission gear stage.

FIG. 13 shows the hydraulic circuit which pre-shifts one of the even-numbered speed transmission gear stages (the reverse transmission gear stage) while the vehicle is running with one of the odd-numbered speed transmission gear stages. On this occasion, the first shift valve VA1 (the fourth shift valve VA4) is located in the ○ position, the second shift valve VA2 is located in the x position, the 3A-numbered shift valve VA3A is located in the x position, and the 3B-numbered shift valve VA3B is located in the x position.

As clear from FIG. 13 in addition to the reference to FIG. 10, in this case, the hydraulic pressure from the first linear solenoid LS1 works on the first clutch CL1, and the hydraulic pressure from the second linear solenoid LS2 works on the reverse piston PSR. In addition, the hydraulic pressure from the second linear solenoid LS2 works on the fourth speed piston PS4, too. However, since the pressure-receiving area of the reverse piston PSR is set larger than the pressure-receiving area of the fourth speed piston PS4, the reverse piston PSR can be operated, and the reverse transmission gear stage can be pre-shifted without interference.

Figure 14:
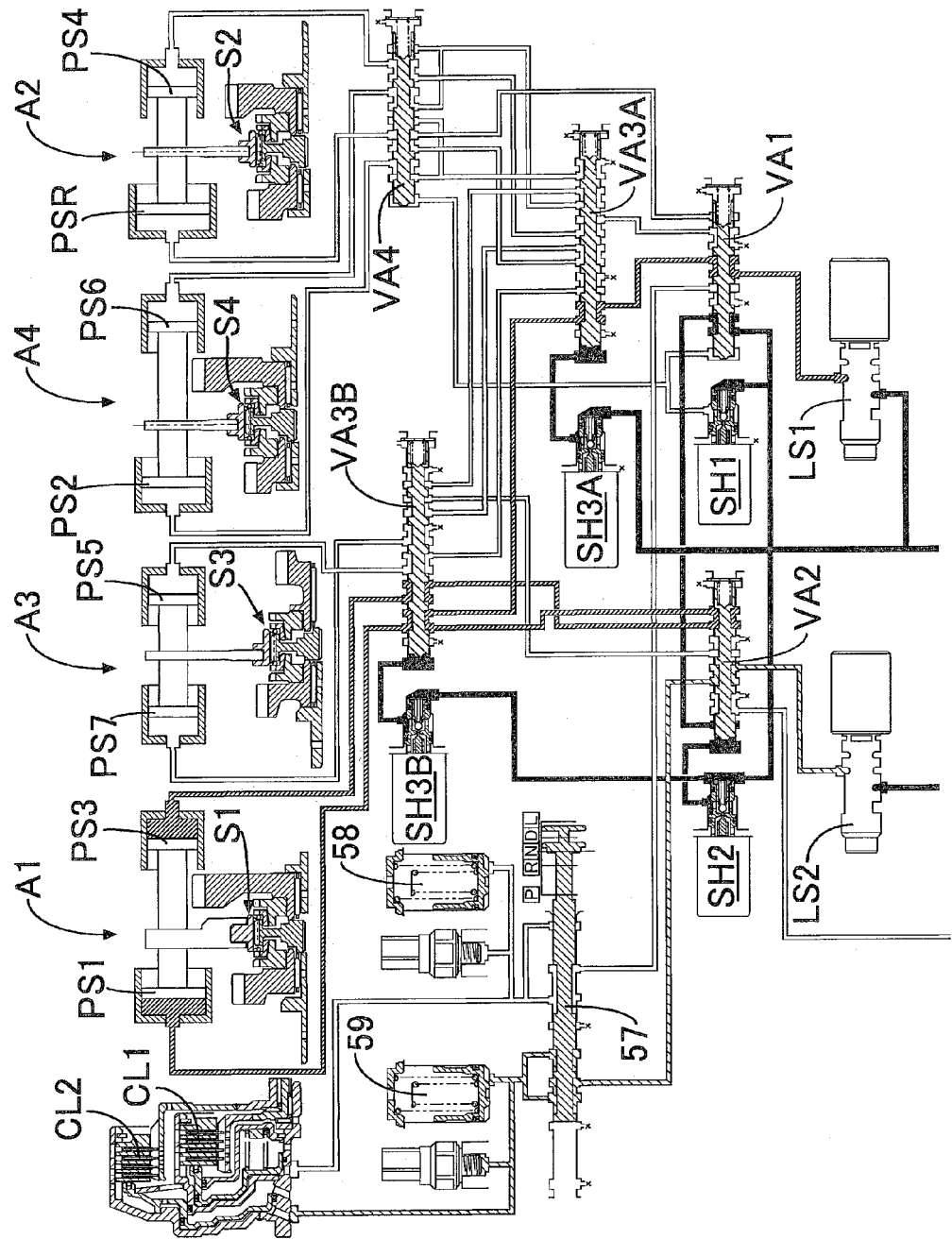
FIG. 14 is a diagram showing the hydraulic circuit according to the second embodiment, which pre-shifts an odd-numbered speed transmission gear stage while the vehicle is running with an even-numbered speed transmission gear stage.

FIG. 14 shows the hydraulic circuit which pre-shifts one of the odd-numbered speed transmission gear stages (the first speed transmission gear stage) while the vehicle is running with one of the even-numbered speed transmission gear stages. On this occasion, the first shift valve VA1 (the fourth shift valve VA4) is located in the x position, the second shift valve VA2 is located in the ○ position, the 3A-numbered shift valve VA3A is located in the ○ position, and the 3B-numbered shift valve VA3B is located in the ○ position.

As clear from FIG. 14 in addition to the reference to FIG. 10, in this case, the hydraulic pressure from the second linear solenoid LS2 works on the second clutch CL2, and the hydraulic pressure from the first linear solenoid LS1 works on the first speed piston PS1. In addition, the hydraulic pressure from the first linear solenoid LS1 works on the third speed piston PS3, too. However, since the pressure-receiving area of the first speed piston PS1 is set larger than the pressure-receiving area of the third speed piston PS3, the first speed piston PS1 can be operated, and the first speed transmission gear stage can be pre-shifted without interference.

Figure 15:
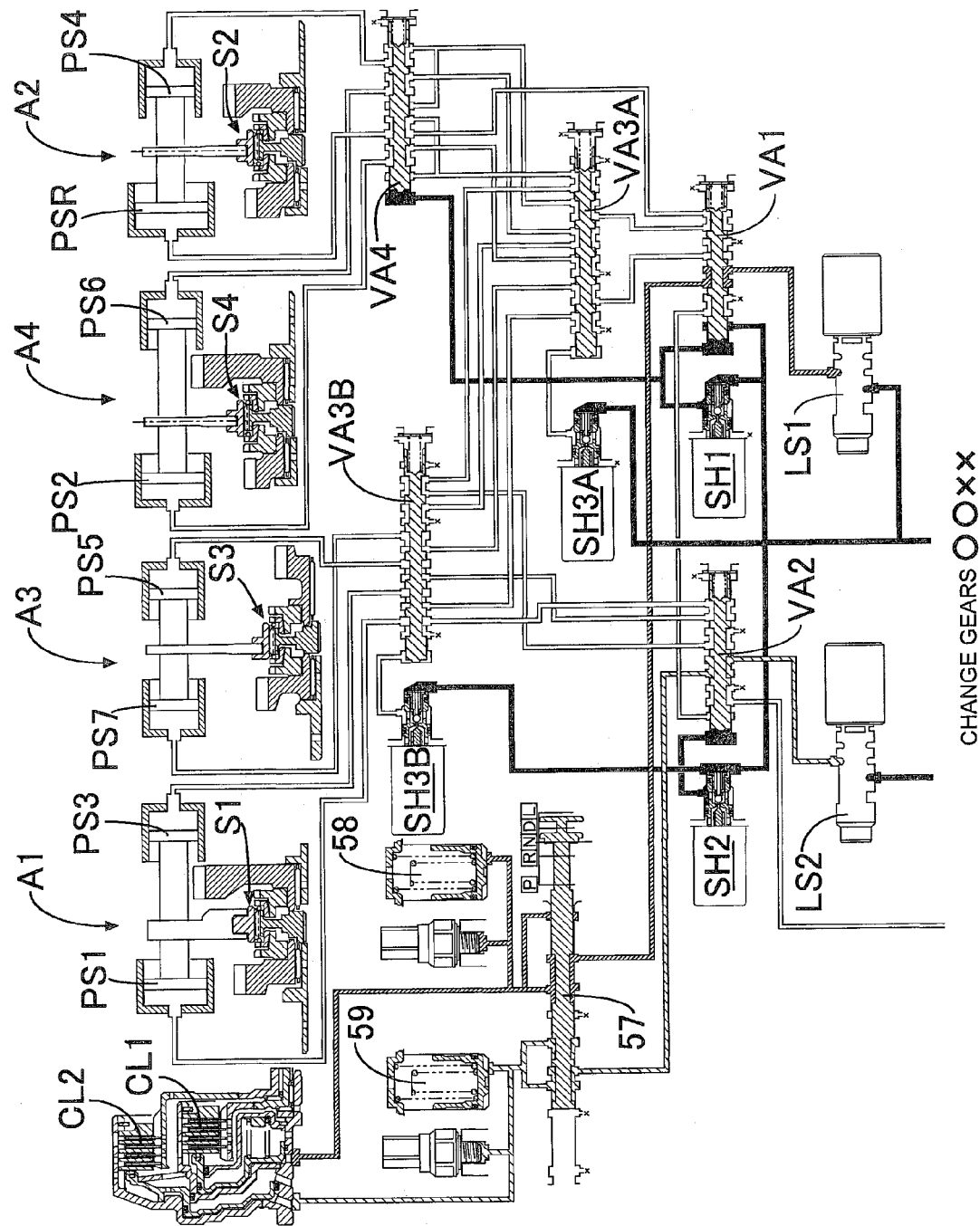
FIG. 15 is a diagram showing the hydraulic circuit according to the second embodiment, which changes gears after pre-shifting one transmission gear stage.

FIG. 15 shows the hydraulic circuit which changes gears after one transmission gear stage is pre-shifted. On this occasion, the first shift valve VA1 (the fourth shift valve VA4) is located in the ○ position, the second shift valve VA2 is located in the ○ position, the 3A-numbered shift valve VA3A is located in the x position, and the 3B-numbered shift valve VA3B is located in the x position.

As clear from FIG. 15 in addition to the reference to FIG. 10, in this case, the hydraulic pressure from the first linear solenoid LS1 works on the first clutch CL1, and the hydraulic pressure from the second linear solenoid LS2 works on the second clutch CL2. For this reason, increase of an output from one of the first linear solenoid LS1 and the second linear solenoid LS2 in exchange for decrease of the other of the first linear solenoid LS1 and the second linear solenoid LS2 makes it possible to change gears by grabbing one of the first and second clutches CL1, CL2 in exchange for releasing the other of the first and second clutches CL1, CL2.

Figure 16:
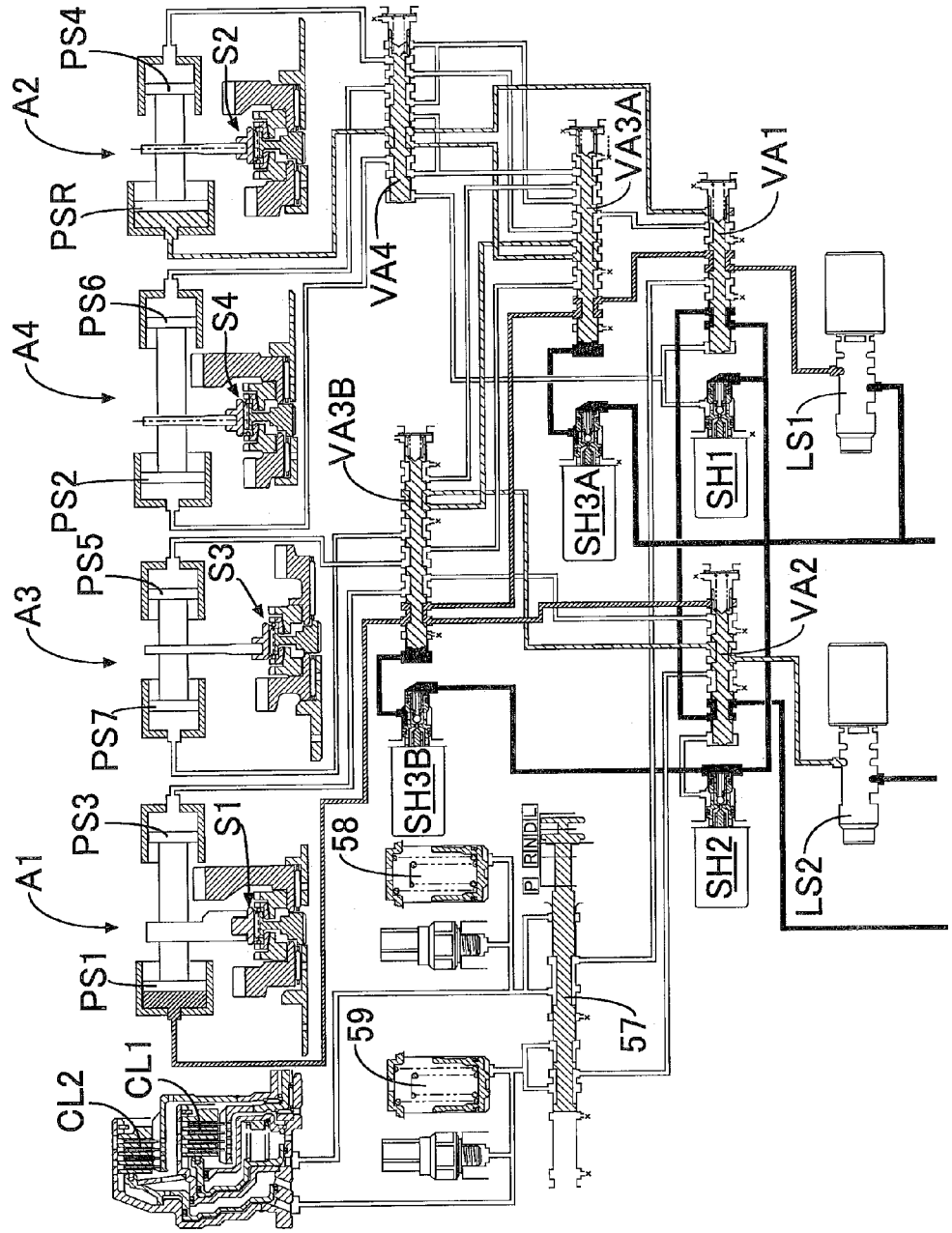
FIG. 16 is a diagram showing the hydraulic circuit according to the second embodiment, which pre-shifts one transmission gear stage when the transmission goes into failure.

FIG. 16 shows the hydraulic circuit which pre-shifts one of the transmission gear stages (the reverse transmission gear stage) in failure condition. On this occasion, the first shift valve VA1 (the fourth shift valve VA4) is located in the x position, the second shift valve VA2 is located in the x position, the 3A-numbered shift valve VA3A is located in the ○ position, and the 3B-numbered shift valve VA3B is located in the ○ position.

As clear from FIG. 16 in addition to the reference to FIG. 10, in this case, no hydraulic pressure works on either of the first clutch CL1 or the second clutch CL2. Instead, the hydraulic pressure from the first linear solenoid LS1 works on the first speed piston PS1, and the hydraulic pressure from the second linear solenoid LS2 works on the reverse piston PSR. For this reason, while the operation of the first speed piston PS1 is being prohibited by closing the first linear solenoid LS1, the reverse piston PSR is operated with the hydraulic pressure which is outputted from the second linear solenoid LS2. Thereby, the reverse transmission gear stage can be pre-shifted.

The foregoing descriptions have been provided for the embodiments of the present invention. Various design modification can be made on the present invention without departing from the gist of the present invention.

For instance, in the embodiments, the third shift valve of the present invention is composed of two valves, that is, the 3A-numbered shift valve VA3A and the 3B-numbered shift valve VA3B. Instead, the third shift valve may be composed of a single valve. Otherwise, the third shift valve may be composed of three valves or more.

Furthermore, in the embodiments, the gears which are connected together by the synchronization apparatuses are installed on the first and second output shafts 16, 17 sides. Instead, such gears may be installed on the first and second auxiliary input shafts 14, 15 sides.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A control system for a transmission, comprising:
   a first clutch for transmitting a driving force of an engine to a first input shaft;
   a first gear group placed in a first power transmission path from the first input shaft to an output shaft;
   a plurality of first engagement means for setting up one of first predetermined transmission gear stages by connecting one gear of the first gear group to the first input shaft or the output shaft;
   a plurality of first hydraulic actuators for operating the plurality of first engagement means, respectively;
   a second clutch for transmitting the driving force of the engine to a second input shaft;
   a second gear group placed in a second power transmission path from the second input shaft to the output shaft;
   a plurality of second engagement means for setting up one of second predetermined transmission gear stages by connecting one gear of the second gear group to the second input shaft or the output shaft;
   a plurality of second hydraulic actuators for operating the plurality of second engagement means, respectively;
   a first shift valve, operated by a first shift solenoid, for supplying a hydraulic pressure to the first clutch or one of the first hydraulic actuators, the hydraulic pressure being outputted by a first hydraulic pressure regulating device;
   a second shift valve, operated by a second shift solenoid, for supplying a hydraulic pressure to the second clutch or one of the second hydraulic actuators, the hydraulic pressure being outputted by a second hydraulic pressure regulating device;
   a third shift valve, operated by a third shift solenoid, for supplying the hydraulic pressures, which are outputted by the respective first and second shift valves, selectively to any one of the first and second hydraulic actuators; and
   a fourth shift valve placed between the third shift valve and the second hydraulic actuators, the fourth shift valve being operated by the first shift solenoid.

2. The control system for a transmission according to claim 1, wherein the second predetermined transmission gear stages include a forward transmission gear stage and a reverse transmission gear stage.

3. The control system for a transmission according to claim 1, wherein the third shift valve comprises two third shift valves which are placed in series.

4. The control system for a transmission according to claim 2, wherein the third shift valve comprises two third shift valves which are placed in series.

5. The control system for a transmission according to claim 3, wherein the third shift solenoid comprises two third shift solenoids, and said two third shift valves placed in series are operated by the third shift solenoids, respectively.

6. The control system for a transmission according to claim 4, wherein the third shift solenoid comprises two third shift solenoids, and said two third shift valves placed in series are operated by the third shift solenoids, respectively.

7. The control system for a transmission according to claim 1, wherein the first shift valve and the fourth shift valve are made as separated bodies, respectively.

8. The control system for a transmission according to claim 2, wherein the first shift valve and the fourth shift valve are made as separated bodies, respectively.

9. The control system for a transmission according to claim 3, wherein the first shift valve and the fourth shift valve are made as separated bodies, respectively.

10. The control system for a transmission according to claim 4, wherein the first shift valve and the fourth shift valve are made as separated bodies, respectively.

11. The control system for a transmission according to claim 5, wherein the first shift valve and the fourth shift valve are made as separated bodies, respectively.

12. The control system for a transmission according to claim 6, wherein the first shift valve and the fourth shift valve are made as separated bodies, respectively.

13. The control system for a transmission according to claim 1, wherein the first shift valve and the fourth shift valve are made as a single integrated body.

14. The control system for a transmission according to claim 2, wherein the first shift valve and the fourth shift valve are made as a single integrated body.

15. The control system for a transmission according to claim 3, wherein the first shift valve and the fourth shift valve are made as a single integrated body.

16. The control system for a transmission according to claim 4, wherein the first shift valve and the fourth shift valve are made as a single integrated body.

17. The control system for a transmission according to claim 5, wherein the first shift valve and the fourth shift valve are made as a single integrated body.

18. The control system for a transmission according to claim 6, wherein the first shift valve and the fourth shift valve are made as a single integrated body.

* * * * *